United States Patent [19]
Herz et al.

[11] Patent Number: 6,088,722
[45] Date of Patent: *Jul. 11, 2000

[54] SYSTEM AND METHOD FOR SCHEDULING BROADCAST OF AND ACCESS TO VIDEO PROGRAMS AND OTHER DATA USING CUSTOMER PROFILES

[76] Inventors: Frederick Herz, Condominium C-304, Herzwood, Canaan Valley, Davis, W. Va. 26260; Lyle Ungar, 321 S. 20th St., Philadephia, Pa. 19103; Jian Zhang, 412E, 836 Cooper Landing Rd., Cherry Hill, N.J. 08002; David Wachob, 8379 Glen Rd., Elkins Park, Pa. 19027; Marcos Salganicoff, 2425 Olive St., Phiadelphia, Pa. 19130

[ * ] Notice: This patent is subject to a terminal disclaimer.

[21] Appl. No.: 08/849,589
[22] PCT Filed: Nov. 29, 1995
[86] PCT No.: PCT/US95/15429
  § 371 Date: Dec. 24, 1997
  § 102(e) Date: Dec. 24, 1997
[87] PCT Pub. No.: WO96/17467
  PCT Pub. Date: Jun. 6, 1996

Related U.S. Application Data

[63] Continuation-in-part of application No. 08/346,425, Nov. 29, 1994, Pat. No. 5,758,267.

[51] Int. Cl.[7] .............................. H04N 7/10; H04N 7/14; H04N 7/173; H04H 1/02
[52] U.S. Cl. ................................. 709/217; 348/1; 348/7; 348/10; 348/12; 455/2; 455/5.1; 455/6.2
[58] Field of Search ........................ 395/200.47–200.49; 455/2, 4.1, 4.2, 5.1, 6.2; 380/6–8, 10, 11–20, 21; 348/1, 6, 7, 10, 12, 13, 906, 2; 707/104; 709/217–219; H04N 7/16, 7/14, 7/173, 7/10

[56] References Cited

U.S. PATENT DOCUMENTS

| | | | |
|---|---|---|---|
| 4,170,782 | 10/1979 | Miller | 358/84 |
| 4,264,924 | 4/1981 | Freeman | 358/86 |
| 4,381,522 | 4/1983 | Lambert | 358/86 |

(List continued on next page.)

OTHER PUBLICATIONS

Lambert, "Personalized Mass Media Corp. Seeks Patent Partners," *Cable Technologies*, Nov. 30, 1993.

(List continued on next page.)

*Primary Examiner*—John W. Miller
*Attorney, Agent, or Firm*—Woodcock Wasburn Kurtz Mackiewicz & Norris LLP

[57] ABSTRACT

A system and method for scheduling the receipt of desired movies and other forms of data from a network, which simultaneously distributes many sources of such data to many customers, as in a cable television system. Customer profiles are developed for the recipient describing how important certain characteristics of the broadcast video program, movie, or other data are to each customer. From these profiles, an "agreement matrix" is calculated by comparing the recipient's profiles to the actual profiles of the characteristics of the available video programs, movies, or other data. The agreement matrix thus characterizes the attractiveness of each video program, movie, or other data to each prospective customer. "Virtual" channels are generated from the agreement matrix to produce a series of video or data programming which will provide the greatest satisfaction to each customer. Feedback paths are also provided so that the customer's profiles and/or the profiles of the video programs or other data may be modified to reflect actual usage, and so that the data downloaded to the customer's set top terminal may be minimized. Kiosks are also developed which assist customers in the selection of videos, music, books, and the like in accordance with the customer's objective profiles.

27 Claims, 11 Drawing Sheets

U.S. PATENT DOCUMENTS

| | | |
|---|---|---|
| 4,694,490 | 9/1987 | Harvey et al. ............................. 380/20 |
| 4,704,725 | 11/1987 | Harvey et al. .............................. 380/9 |
| 4,706,121 | 11/1987 | Young ..................................... 358/142 |
| 4,745,549 | 5/1988 | Hashimoto ............................. 364/402 |
| 4,751,578 | 6/1988 | Reiter et al. ............................ 358/183 |
| 4,870,579 | 9/1989 | Hey ........................................ 364/419 |
| 4,965,825 | 10/1990 | Harvey et al. .............................. 380/9 |
| 4,977,455 | 12/1990 | Young ..................................... 358/142 |
| 4,996,642 | 2/1991 | Hey ........................................ 364/419 |
| 5,003,591 | 3/1991 | Kauffman et al. ....................... 380/10 |
| 5,075,771 | 12/1991 | Hashimoto ............................... 358/84 |
| 5,109,414 | 4/1992 | Harvey et al. .............................. 380/9 |
| 5,151,789 | 9/1992 | Young .................................. 358/194.1 |
| 5,155,591 | 10/1992 | Wacob ..................................... 358/86 |
| 5,223,924 | 6/1993 | Strubbe .................................... 358/86 |
| 5,230,020 | 7/1993 | Hardy et al. ............................. 380/21 |
| 5,233,654 | 8/1993 | Harvey et al. ........................... 380/20 |
| 5,237,157 | 8/1993 | Kaplan ................................... 235/375 |
| 5,245,420 | 9/1993 | Harney et al. ............................. 348/7 |
| 5,251,324 | 10/1993 | McMullan, Jr. ........................... 348/1 |
| 5,351,075 | 9/1994 | Herz et al. ................................. 348/1 |
| 5,353,121 | 10/1994 | Young et al. ........................... 348/563 |
| 5,410,344 | 4/1995 | Graves et al. .............................. 348/1 |
| 5,469,206 | 11/1995 | Strubbe et al. ........................... 348/12 |
| 5,483,278 | 1/1996 | Strubbe et al. ............................. 348/7 |
| 5,534,911 | 7/1996 | Levitan ..................................... 348/1 |
| 5,541,638 | 7/1996 | Story ......................................... 348/7 |
| 5,559,549 | 9/1996 | Hendricks et al. ......................... 348/6 |
| 5,600,364 | 2/1997 | Hendricks et al. ......................... 348/1 |
| 5,717,923 | 2/1998 | Dedrick ............................. 707/104 X |
| 5,758,257 | 5/1998 | Herz et al. ................................ 455/2 |

OTHER PUBLICATIONS

Moss, "ADcom Starts Cable–Meter Rollout in California," *Multichannel News*, Apr. 25, 1994, p. 34.

Otis Port, "Wonder Chips—How They'll Make Computing Power Ultrafast and Ultracheap," *Business Week*, Jul. 4, 1994, pp. 86–92.

Jonathan Berry, "A Potent New Tool for Selling Database Marketing," *Business Week*, Sep. 5, 1994, pp. 34–40.

William L. Thomas, "Electronic Program Guide Applications—The Basics of System Design," *1994 NCTA Technical Papers*, pp. 15–20.

Judith H. Irven et al., "Multi–Media Information Services: A Laboratory Study," *IEEE Communications Magazine*, vol. 26, No. 6, Jun., 1988, pp. 24–44.-

SYSTEM AND METHOD FOR SCHEDULING BROADCAST OF AND ACCESS TO VIDEO PROGRAMS AND OTHER DATA USING CUSTOMER PROFILES

CROSS-REFERENCE TO RELATED APPLICATIONS

The present application is a continuation-in-part application of U.S. patent application Ser. No. 08/346,425, filed Nov. 29, 1994 now U.S. Pat. No. 5,758,257.

BACKGROUND OF THE INVENTION

1. Field of the Invention

The present invention relates to a system and method for controlling broadcast of and/or customer access to data such as video programs in accordance with objective profile data indicative of the customer's preferences for that data. More particularly, a preferred embodiment of the invention relates to a system and method for determining from objective profile data of the customers which data or video programming is most desired by each customer so that the customers may receive data or video programming customized to their objective preferences. The objective profile data is updated on a continuing basis to reflect each customer's changing preferences so that the content of the data channels or video programming may be updated accordingly.

2. Description of the Prior Art

The so-called "Information Super Highway" is expected to bring wondrous technological changes to society. Data of all kinds will become readily available to the public in quantities never before imaginable. Recent breakthroughs in video compression technologies are expected to extend the "Information Super Highway" right into the video realm by allowing customers to receive literally hundreds of video channels in their homes. While the prospects of opening a whole new world of information to the average person are exciting, there is much concern that the average person will simply be overwhelmed by the quantity of data piped into their homes. Some techniques must be developed which permit the travelers of the Information Super Highway to navigate through the plethora of available information sources without getting hopelessly lost.

For example, in the home video context, it is desired to provide mechanisms which present the available video information to the customers in a comprehensible way. Such mechanisms should eliminate the necessity of "channel surfing" to find a program suitable for viewing out of the hundreds of video programming alternatives which are expected to be made available. The present invention is thus designed to help the customer of video and other data services to receive, with minimal effort, the information he or she is most interested in.

Numerous systems are available which assist customers in determining which video programs to watch. For example, electronic program guides and the like are available which give customers on-screen access to the upcoming programming whereby the desired programming may be selected in advance for later recording. An early system described in U.S. Pat. No. 4,170,782 to Miller allows the viewer to preselect a television viewing schedule of desired television channels to be viewed during subsequent time periods. Miller also monitors the television programs actually watched by the television viewer and relays this information to a central data processing center over a communication link. Subsequent interactive cable systems, such as that described by Freeman in U.S. Pat. No. 4,264,924, permit the viewer to select the information to be received on particular channels. The cable system described by Freeman also provides individually tailored messages to the individual viewers. Similarly, Young disclosed in U.S. Pat. No. 4,706,121 a system which permits the viewer to select programs from schedule information by controlling a programmable television tuner to provide the broadcast signals for the selected programs to the television receiver at the time of broadcast. This system can also be used to control a VCR for unattended recording of the selected programs. Further details of such a VCR recording system is provided by Young in U.S. Pat. Nos. 4,977,455 and 5,151,789. Other systems, such as that described by Reiter et al. in U.S. Pat. No. 4,751,578, provide updatable television programming information via telephone link, magnetic cards, floppy disks, television or radio sub-carrier, and the like, to the viewer's television screen in such a manner that the viewer may selectively search this information.

Unfortunately, in each of the aforementioned prior art systems, the customer must actively select the desired programming. In other words, these systems facilitate access to programming designated by the customer but provide no assistance to the customer in determining what programming to select for subsequent viewing. With the possibility of several hundred video channels soon becoming available to video customers, additional systems are desirable which assist the customer in selecting the desired programming.

The system described by Herz et al. in U.S. Pat. No. 5,351,075 partially addresses the above problems, at least with respect to the provision of movies over cable television. As described therein, members of a "Home Video Club" select the video programs they would like to see in the following week. A scheduling computer receives the members' inputs for the current week and determines the schedule for the following week based upon the tabulated preferences. This schedule is then made available to the members of the Home Video Club. If, when, and how often a particular video program is transmitted is determined by the customer preferences received by the scheduling computer. Prime time viewing periods are used to make certain that the most popular video programs are broadcast frequently and at the most desirable times. As with the aforementioned systems, the "Home Video Club" system does not automatically broadcast the most desired video programs to the customers but instead requires the active participation of the customers to "vote" for the most desired video programs for subsequent viewing.

It is desired to extend a customer preference system such as the "Home Video Club" to include general cable programming offerings and to minimize active customer involvement in the determination of the desired programming. Unlike the movie scheduling system described in the "Home Video Club" application, the number and content of general cable programming channels is scheduled in advance and typically cannot be changed by the customer through a simple voting system. As a result, the customer can only vary his or her video programming by changing channels. In other words, the customer typically illustrates his or her programming preferences by changing channels. Indeed, such changes are monitored by Nielsen, Arbitron, and other ratings agencies in setting the rates for advertising. In U.S. Pat. No. 5,155,591, one of the present inventors carried this concept a step further by obtaining information about the customers and then demographically targeting television commercials to the customers most likely to respond favorably to such advertising. Unfortunately, however, this demographic and customer preference information has not been specifically described for providing customized channels which better reflect the customers' preferences for the programming itself.

The present inventors have found that the aforementioned problems may be overcome by creating customized programming channels from all of the programming available at any time and broadcasting the customized programming channels to groups of customers. The customer's set top multimedia terminal then creates "virtual channels" as a collection of the received programming data from one or more of the customized programming channels at any point in time for receipt on the customer's television. These virtual channels are received as an additional offering to the regular broadcast transmission and are customized to the customer's preferences. Thus, as used herein, a "virtual channel" is a channel formed as a composite of several source materials or programs which may or may not change during respective time periods to reflect the programming most desirable to the customer during that time period. The creation of such "virtual channels" is intended to minimize the amount of "channel surfing" necessary to find the most preferred video program at a particular time.

Previous attempts at providing such selective access to programming have required active customer participation. For example, in U.S. Pat. No. 4,381,522, Lambert disclosed a system in which the customer is permitted to specify which television signal source is to be connected to the video switch for broadcasting of a desired television program to the customer. The desired program is selected from a program schedule channel provided to the customer. Hashimoto discloses more elaborate systems in U.S. Pat. Nos. 4,745, 549 and 5,075,771 in which programs suitable to individual customer's tastes are selected from all of the available television programs in accordance with the customer preferences specified on a customer questionnaire or provided from the customer over a telephone link or the like. The viewer preference data provided using the questionnaires, the telephone lines, and the like is then statistically processed by linear programming to provide an individual subscriber television program list which may be used by the video provider to select which programs to broadcast to particular individuals. Subscriber complaints about the program list are used to "tune" the television program list to better match the individual's tastes. An automatic controller is also used to automatically control a television or video cassette recorder in accordance with the subscriber's specified tastes. However, the system disclosed by Hashimoto works from limited objective data provided by the customer in response to a questionnaire and provides no mechanism for validating the accuracy of the profile of that customer other than through the use of a complaint system. In addition, the system disclosed by Hashimoto does not determine the desirability of particular video programs but merely allows the customer to characterize those types of programs to which he or she may be most interested.

For the reasons noted above, feedback regarding the customer programming and purchasing preferences is highly desirable. It is highly desirable to develop a technique for better acquiring and quantifying such customer video programming and purchasing preferences. Along these lines, Strubbe recently described a system in U.S. Pat. No. 5,223, 924 which provides an interface for automatically correlating the customer preferences with the television program information and then creating and displaying a personalized customer program database from the results of the correlation. In the Strubbe system, the customer specifies whether he or she "likes" a particular video program and the database is updated accordingly. Then, from the video programs "liked" by the customer, a second, personalized, database is created. However, as with each of the systems described above, the Strubbe system does not develop customer profiles and automatically update the database of "liked" videos using feedback. Also, Strubbe does not teach that the preference information may be used to predict what new video programs the customer may like and then schedule those new video programs for viewing.

Those in the technical press have fantasized about so-called "smart" televisions which will keep track of past viewing preferences and suggest new programs that match the customer's personal tastes so that the customer need not "channel surf" through the 500 channel video system of the future. However, prior to the present invention, no one known to the present inventors has been able to make such "smart" televisions a reality. Indeed, the present invention is believed to be the first system to create "virtual channels" of recommended programming for each customer of a video or other data service.

SUMMARY OF THE INVENTION

The present invention relates to a system and method for making available the video programming and other data most desired by the customer by developing an "agreement matrix" characterizing the attractiveness of each available source of video programming or data to each customer. From the agreement matrix, one or more "virtual channels" of data, customized to each customer, are determined. At any given time, the one or more virtual channels include the video programming or other data which is predicted to be most desirable to the customer based on the customer's preferences. The virtual channels are determined by selecting from the available alternatives only those video programs or other data which most closely match the customer's objective preferences.

In accordance with the invention, a method of scheduling customer access to data from a plurality of data sources is provided. Although the technique of the invention may be applied to match customer profiles for such disparate uses as computerized text retrieval, music and music video selection, home shopping selections, infomercials, and the like, in the presently preferred embodiment, the method of the invention is used for scheduling customer access to video programs and other broadcast data. In accordance with the preferred method, objective customer preference profiles are obtained and compared with content profiles of the available video programming. The initial customer profiles are determined from customer questionnaires, customer demographics, relevance feedback techniques, default profiles, and the like, while the initial content profiles are determined from questionnaires completed by "experts" or some sort of customer's panel, are generated from the text of the video programs themselves, and/or are determined by adopting the average of the profiles of those customers who actually watch the video program. Based on the comparison results, one or more customized programming channels are created for transmission, and from those channels, each customer's set top multimedia terminal may further determine "virtual channels" containing a collection of only those video programs having content profiles which best match the customer's profile and hence are most desirable to the customer during the relevant time frame.

Preferably, one or more customer profiles are created for each customer of the video programs. These customer profiles indicate the customer's preferences for predetermined characteristics of the video programs and may vary in accordance with time of day, time of the week, and/or customer mood. Such "characteristics" may include any descriptive feature suitable in describing particular video programs, such as classification category; directors; actors and actresses; degree of sex and/or violence; and the like. Corresponding content profiles are created for each video program available for viewing and generally indicate the degree of content of the predetermined characteristics in each video program. An agreement matrix relating the customer profiles with the content profiles is then generated. Preferably, the agreement matrix enables the system to determine a subset of the available programs at a particular point in time which is most desirable for viewing by the customer. The determined subset of video programs is then presented to the customer for selection in the conventional manner, except that each "virtual channel" includes a collection of the offerings available on all of the originally broadcast channels from the cable system. The "virtual channels" are then generated by the customer's set top multimedia terminal for display on the customer's television. The customer may then select the desired video programming, which may or may not include the programming offered on the "virtual channels." Similar techniques are used at the video head end to determine which video programs to transmit to each node for use in the creation of the "virtual channels" at each customer's set top multimedia terminal.

Preferably, the customer profile creating step comprises the step of creating a plurality of customer profiles for each customer, where the plurality of customer profiles are representative of the customer's changing preferences for the predetermined characteristics in accordance with time of the day and of the week. In such an embodiment, the agreement matrix determining step comprises the step of using different customer profiles for each customer in accordance with the time of the day and of the week, thereby reflecting changes in the customer's preferences or "moods" during the course of the week. In addition, the customer profile creating step preferably comprises the step of clustering customer profiles for combinations of customers expected to view the video programs at a particular customer location at particular times on particular days. For example, the clustered profiles for a customer's residence may contain the combined profiles of Mom and Dad in the evening and the combined profiles of the children in the afternoon. In this embodiment, the agreement matrix determining step comprises the step of using the different clustered customer profiles in accordance with the time of the day and of the week. Alternatively, the appropriate customer profiles for use in calculating the agreement matrix may be determined directly from identity information received from the customer or assigned to the customer in accordance to the cluster of customers to which that customer belongs. In the latter technique, it will be appreciated that customer profiles are not strictly necessary since each customer is assigned an initial customer profile determined from the clustered profiles of the other customers in his or her cluster of customers.

In the presently preferred embodiment of the invention, the agreement matrix determining step comprises the step of comparing the customer profiles with the content profiles for each video program available for viewing in a predetermined time period. In particular, the agreement matrix determining step preferably comprises the step of determining a distance in multidimensional characteristic space between a customer profile and a content profile by calculating an agreement scalar for common characteristics, ac, between the customer profile, cv, and the content profiles, cp, in accordance with the relationship:

$$ac_{ij} = 1/[1 + \Sigma_k w_{ik} |cv_{ik} - cp_{jk}|],$$

for i=a particular customer of a number of customers I, j=a particular video program of a number of video programs J, and k=a particular video program characteristic of a number of video program characteristics K, where $W_{ik}$ is customer i's weight of characteristic k. As will be appreciated by those skilled in the art, an agreement matrix so defined is the reciprocal of the distance d (=1/ac) in multi-dimensional space between the customer profile vector and the content profile vector and that many different distance measurement techniques may be used in determining the distance d. In such an embodiment, the subset determining step preferably comprises the steps of sorting the video programs in an order of ac indicating increasing correlation and selecting as the subset a predetermined number of the video programs having the values for ac indicating the most correlation.

When scheduling video programs at a head end using the techniques of the invention, the agreement matrix is preferably determined from customer profiles of a plurality of customers and the video programming is scheduled using the steps of:

(a) determining a video program j which most closely matches the customer profiles of the plurality of customers of the video programs;

(b) scheduling the video program j for receipt by the plurality of customers and decrementing a number of channels available for transmission of video programs to said customers;

(c) when the number of channels available for transmission of video programs to a particular customer of the plurality of customers reaches zero, removing the particular customer from the plurality of customers for scheduling purposes; and (d) repeating steps (a)–(c) until the number of video programs scheduled for transmission equals the number of channels available for transmission of video programs.

In accordance with a currently preferred embodiment of the invention, a passive feedback technique is provided for updating the customer profiles in accordance with the video programming actually watched by the customer. Such a method in accordance with the invention preferably comprises the steps of:

creating at least one customer profile for each customer of the video programs, the customer profile indicating the customer's preferences for predetermined characteristics of the video programs;

creating content profiles for each video program available for viewing, the content profiles indicating the degree of content of the predetermined characteristics in each video program;

monitoring which video programs are actually watched by each customer; and updating each customer profile in accordance with the content profiles of the video programs actually watched by that customer to update each customer's actual preferences for the predetermined characteristics.

Preferably, the monitoring function is accomplished by storing, at each customer's set top multimedia terminal, a record of the video programs actually watched by the customer at the customer's location and, in the case of a system with a two-way communication path to the head end, polling the set top multimedia terminals of all customers to retrieve the records of the video programs actually watched by the customers at each customer location. Also, from the retrieved records, combined customer profiles may be determined which reflect the customer profiles of a plurality of customers. Then, by determining the agreement matrix using the combined customer profiles for each node, programming channels containing the video programming which are collectively most desired by the customers making up the combined customer profiles may be determined for transmission from the head end to each of the customers connected to the same node.

When a predicted video program is not selected by the customer, it is desirable to update the agreement matrix to better reflect the customer's tastes. The updating of the agreement matrix may be accomplished in a variety of ways. For example, the customer profile, $cv_{ik}$, for customer i and video program characteristic k may be adjusted to a new customer profile, $cv_{ik}'$, in accordance with the equation:

$$cv_{ik}' = cv_{ik} - \Delta(cv_{ik} - cp_{jk}),$$

where $cp_{jk}$ represents the degree of video program characteristic k in video program j and $\Delta$ is a small constant which can vary in accordance with the desired accuracy for the profiles. On the other hand, customer i's weighting of video program characteristic k, $w_{ik}$, in the customer profile, $cv_{ik}$, may be adjusted to a new weighting, $w_{ik}'$, in accordance with the equation:

$$w_{ik}' = (w_{ik} - \Delta|cv_{ik} - cp_{jk}|)/\Sigma_k(w_{ik} - \Delta|cv_{ik} - cp_{jk}|).$$

In addition, the content profiles, $cp_{jk}$, of certain video programs j having video program characteristics k may be adjusted to new content profiles, $cp_{jk}'$, to update the customer profiles of customers i who actually watch video program j, in accordance with the equation:

$$cp_{jk}' = cp_{jk} - \Delta(cv_{ik} - cp_{jk}),$$

where $cv_{ik}$ represents the customer profile of customer i for video program characteristic k. Of course, other updating techniques are also possible within the scope of the invention.

Since the data passing from the set top multimedia terminal to the head end contains data which the customers may consider to be confidential, the two-way transmission system of the invention may be modified to encrypt the transmissions from the set top multimedia terminals to the head end. Similarly, as in the case of pay-per-view programming, it is often desirable to encrypt the transmissions from the head end to the set top multimedia terminals. In accordance with the invention, a secure transmission system from the head end to the set top multimedia terminal is obtained by performing the steps of:

(1) At the set top multimedia terminal, generate a seed random number N to be used for the random number generator.

(2) Retrieve the public key P from the head end and encrypt the seed random number N as E(N,P) at the set top multimedia terminal using a public key algorithm such as RSA which is known to be difficult to break.

(3) Send the encrypted seed N (E(N,P)) to the head end where E(N,P) is received and decrypted to yield N using the head end's private key Q.

(4) The head end and set top multimedia terminals then initialize their respective pseudo-random number generators with N as a seed.

(5) Begin the encryption at the head end by generating the first number in the sequence $K_i$ and logically exclusive-ORing it with the first data word in the stream $P_i$, thereby forming $C_i$ (i.e., $C_i = EOR(K_i, P_i)$).

(6) Send the result $C_i$ from the encryptor at the head end to the set top.

(7) Form $K_i$ at the synchronized random number generator of the set top multimedia terminal, which has also been initialized with seed N, by decrypting the received $C_i$ to yield $P_i$. This is done by exclusive-ORing $K_i$ with $C_i$ to yield $P_i$ (i.e., $P_i = EOR(K_i, C_i)$), generating the next pseudo-random $K_i$ in the sequence at the head end and the set top multimedia terminal, determining whether all words i in the sequence have been decrypted, and repeating steps (5)–(6) until all words in the digital video stream have been decrypted. Normal processing of the digital video stream continues from that point. Secure transmission from the set top multimedia terminal to the head end is obtained in the same manner by reversing the set top multimedia terminal and the head end in steps (1)–(7) above.

Those skilled in the art will appreciate that the techniques described herein are applicable to numerous other areas of technology in which it is desirable to assist the customer in the selection of a data service which best meets that customer's needs. For example, the agreement matrix may be used at a head end to minimize the amount of data, such as electronic program guide data, which is to be stored at the user's terminal, thereby minimizing memory requirements of the user's terminal. As another example, the agreement matrix of the invention may be used to facilitate text retrieval in a computer database system and may be implemented in a kiosk or personal computer designed to assist in the selection of movies, music, books, and the like. All such embodiments will become apparent to those skilled in the art from the following description of the preferred embodiments.

BRIEF DESCRIPTION OF THE DRAWINGS

The above and other objects and advantages of the invention will become more apparent and more readily appreciated from the following detailed description of the presently preferred exemplary embodiments of the invention taken in conjunction with the accompanying drawings, of which:

FIG. 11 is a simplified block diagram of a computer kiosk or personal computer which uses the profile and clustering techniques of the invention to assist a customer in the selection of videos for rental, music or books for purchase, and the like.

DETAILED DESCRIPTION OF THE PRESENTLY PREFERRED EMBODIMENTS

Figure 1:
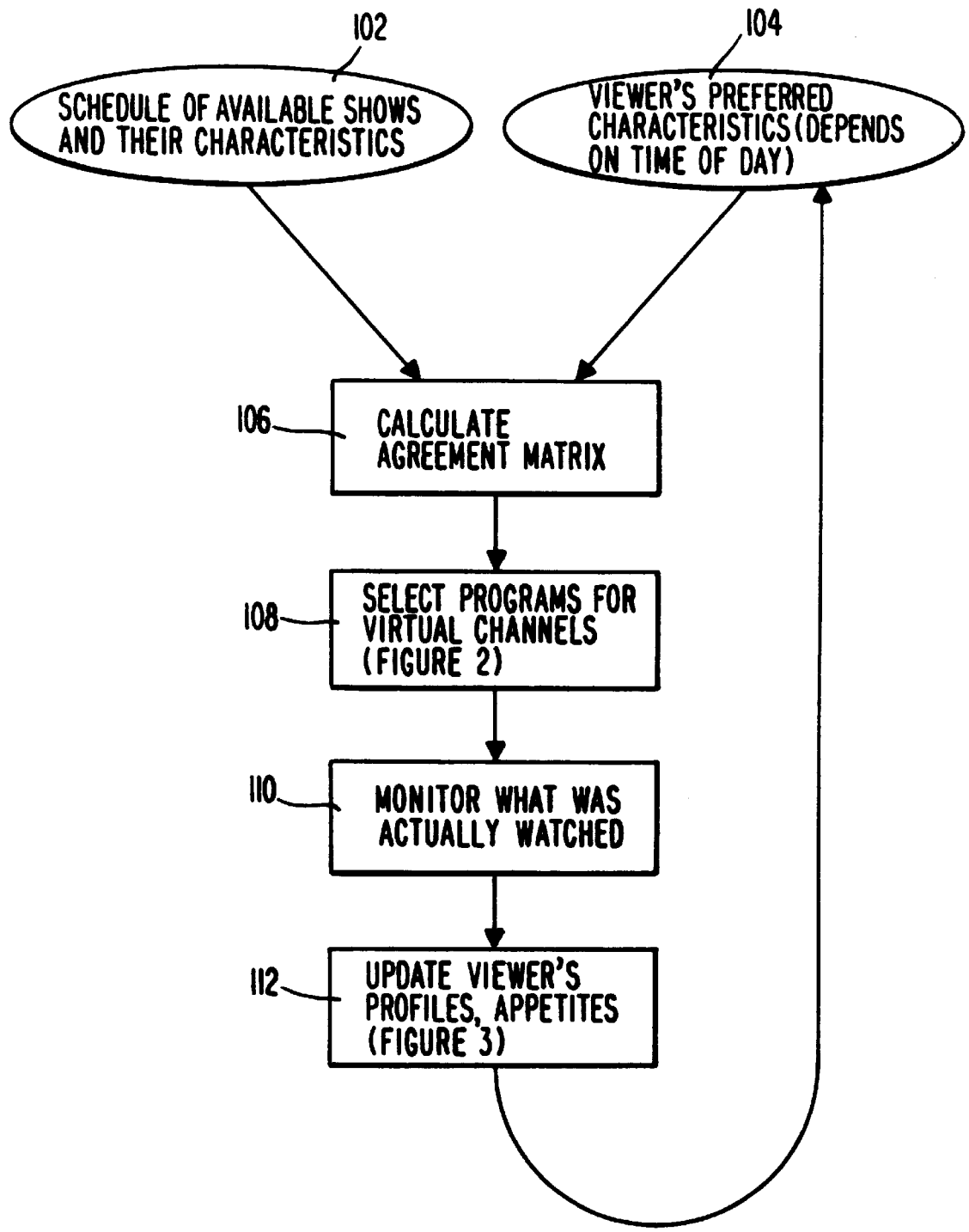
FIG. 1 is a flow chart illustrating the flow of processing of the customer and content profile data in accordance with a preferred embodiment of the invention.

The present invention will be described in detail below with respect to FIGS. 1–11. Those skilled in the art will appreciate that the description given herein is for explanatory purposes only and is not intended to limit the scope of the invention. For example, while the invention is described with respect to a cable television broadcasting system, those skilled in the art will appreciate that the system described herein may also be used for selecting receipt of desired data services and shop at home services, and for selecting from available music and multimedia offerings. Accordingly, the scope of the invention is only to be limited by the scope of the appended claims.

I. Overview

The present invention relates to a customer profile system in which the characteristics of a data source are quantified in some objective manner and stored as content profiles and the customer's preferences for those characteristics are stored in the form of one or more customer profiles. In the following detailed description, the present inventors will describe how the techniques of the invention are used for creating content profiles which characterize the data sources in accordance with their degree of content of predetermined characteristics. Techniques will also be described for creating, weighting, and updating customer profiles which reflect the customer's affinity for those predetermined characteristics. From the content profiles and the customer profiles, an agreement matrix will be described which matches the customers' preferences and the contents of the data sources available at any point in time. As will be described in detail below, the agreement matrix is used at the customer's set top multimedia terminal to create "virtual" data channels from the available data sources, or, alternatively, the agreement matrix may be used by the data provider to determine which data sources of those available will have the most appeal to his or her customers.

A preferred embodiment of the invention will be described in the context of a one-way CATV transmission system and a two-way transmission CATV transmission system with feedback for adjusting the agreement matrix. Several of the numerous possible alternative embodiments for application of the techniques of the invention will then be described.

II. Content Profiles and Customer Profiles

As noted above, a preferred embodiment of the invention will be described for application in a CATV distribution system for aiding a customer in the selection of video programming for viewing by matching the available video programming to each customer's objective preferences. Accordingly, the content and customer profiles will include characteristics which are useful in defining the characteristics of video programming. Of course, when the present invention is used to assist in the selection of data from other data sources, the content and customer profiles will include completely different characteristics.

In accordance with the preferred embodiment of the invention, the content profiles describe the contents of video programs and are compared mathematically in a computer to customer profiles to generate an agreement matrix which establishes the degree of correlation between the preferences of the customer or customers and the video programming available during each video programming time slot. The content profiles and the customer profiles are thus described as a collection of mathematical values representing the weighted significance of several predetermined characteristics of the video programming. For ease of description, the present inventors will describe the mathematical basis for the content profiles and the customer profiles in this section and will describe the generation of the agreement matrix and the uses of the agreement matrix in the next section.

A. Terminology

The following subscription indices will be used throughout this specification:

| | | |
|---|---|---|
| i | customers | (i = 1,2, . . ., I); |
| j | programs | (j = i,2, . . ., J); |
| k | characteristics | (k = 1,2, . . ., K); |
| l | categories | (l = 1,2, . . ., L); | and the following variables will be used throughout this specification:

| | |
|---|---|
| $cv_{ik}$: | customer i's rating for characteristic k; |
| $CV_i$: | the vector $\{cv_{ik} | k \epsilon K\}$ which forms customer i's profile for all characteristics k; |
| $sv_{ik}$: | spread (flexibility) in viewer i's rating for characteristic k; |
| $wv_{ik}$: | customer i's weight of characteristic k; |
| $cp_{jk}$: | objective weighting of program j for characteristic k; |
| $CP_j$: | the vector $\{cp_{jk} | k \epsilon K\}$ which forms program j's profile for all characteristics k; |
| $sp_{jk}$: | spread (flexibility) in program j's rating for characteristic k; and |
| $ac_{ij}$: | agreement scalar representing similarity between $CV_i$ and $CP_j$. |

It should be noted at the outset that $cv_{ik}$ indicates customer i's preferred level for characteristic k, while $cp_{jk}$ indicates the level of presence of a characteristic in the program. $sv_{ik}$ and $sp_{jk}$, on the other hand, respectively represent customer is flexibility in accepting different levels of characteristic k and the flexibility in the determination of the degree of content of characteristic k in program j.

cv and cp may have values between 0 and +10, where the actual range number indicates the relevance of that characteristic. In other words, a video programming having a value of +10 for a given characteristic has the highest degree of content for that variable. The values of cv and cp should always be non-negative, since both are related to the level of characteristics, the former being the desired level and the latter being the actual level. Naturally, zero in cv means the customer's rejection of a characteristic, while zero in cp indicates the absence of a characteristic in a program. Those skilled in the art may wish to allow cv to become negative so that the magnitude of negativity could indicate the level of the customer's aversion to a characteristic. However, there are drawbacks in using negative values in this manner. First, a negative value will blur the meaning of cv and sv and weaken the statistical basis for their calculation. Second, cv has been defined as the desired level of a characteristic, which should be non-negative. Thus, the level of aversion is preferably expressed as a point value, instead of a range of values.

Preferably, the level of aversion is expressed by the combination of a zero-value in cv and a certain value in the corresponding wv. For example, when customer i totally rejects characteristic k, $cv_{ik}$ can be set to −1, which means prohibition. Any program k for which $cv_{ik}<0$ will be excluded from the recommendation list for customer i. Of course, as in the Strubbe system, the values could simply be "0" or "1" to indicate the presence or absence of a characteristic.

$wv_{ik}$ illustrates the importance of characteristic k to customer i. Typically, different characteristics bear different levels of importance for a customer, and the introduction of this variable catches the variation. Although any scaling system may be used, the weight variable, wv, may simply weight the associated characteristic on a scale of 0–5, where 5 indicates the highest affinity for the associated characteristic. On the other hand, as in the Strubbe system, the weights could simply indicate a "like" or "dislike" value for each characteristic.

Finally, as will be described in more detail below, the agreement scalar for characteristics, ac, is the weighted average of the values of a variant of the two-sample t test for significance between CV and CP.

B. Creating Initial Customer and Content Profiles

A profile, either of a customer (Customer Profile) or of a program (Content Profile), is composed of arrays of characteristics which define the customer profile vector $CV_i$ and the program profile vector $CP_j$. To increase the accuracy in statistical estimation, the selection of the characteristics should follow the following guidelines:

| | |
|---|---|
| ○ | The characteristics should be descriptive of the features of the programs; |
| ○ | The list should be fairly inclusive, i.e., include all the common features of the programs; and |
| ○ | There should be no synonyms, nor much overlapping in meaning between two or more characteristics. In other words, the correlations between the characteristics are desirably minimized. |

For example, characteristics currently in use for characterizing video programming include film genres such as westerns, comedies, dramas, foreign language, etc. as defined by the American Film Institute and/or as provided via existing television database services; directors; actors/actresses; attributes such as amount and degree of sex, violence, and profanity; MPAA rating; country of origin; and the like. Of course, many other characteristics may be used, such as those characteristics used in the Minnesota Psychological Test or other more particularized categories based on life experiences and emotions. Such characteristics may also be value based by indicating the scientific, socio-political, cultural, imagination evoking, or psychological content as well as the maturity level to which the program appeals.

In accordance with the invention, there are several ways to develop the initial customer and content profiles for such characteristics. For example, the initial customer profile may be assigned on the basis of the customer's zip code or other characteristic demographic information. In other words, the profile may be set to a profile typical of the customer's zip code area or to a typical profile determined by interviews or empirically by monitoring what customers watch. Similarly, each customer may be assigned a generic customer profile which is personalized over time through the profile adjustment techniques to be described below. Alternatively, a customer may be asked to name several of his or her favorite movies and television shows so that an initial customer profile may be determined by combining or averaging the content profiles of the selected movies and television shows. In addition, each customer may complete a ballot for each viewing mood. This latter approach builds upon the technique described by Hashimoto in U.S. Pat. Nos. 4,745,549 and 5,075,771 and will be described in some detail here.

For explanation purposes, it will be assumed that the initial customer profile is determined from an initial customer questionnaire or ballot. When completing the initial questionnaire, the customer may choose between two voting schemes, one (Scheme A) by characteristics, and the other (Scheme B) by categories. Scheme A is straight-forward. In Scheme A, the customer gives acceptable ranges for all the characteristics which identify a video program. The customer's profile {cv|cv∈CV} is immediately obtained by simply calculating the means of these ranges. In Scheme B, however, the customer gives a specific rating for each of the categories. If $ccv_{il}$ is the rating for customer i for category l, with a scale of 10 in which zero means least satisfaction with the category and 10 means the greatest satisfaction, the customer's profile $\{cv_{ik}|cv_{ik} \in CV_i\}$ may be calculated as:

$$cv_{ik}=1/N_{L'}*\Sigma_{l'}cc_{kl'}(1' \epsilon L') \qquad \text{Equation (1)}$$

where L' is the set of categories in which $ccv_{il'}=\max_l ccv_{il'}$ and $N_{L'}$ is the cardinality of L'. In other words, a customer's rating of a characteristic equals the objective content rating of that characteristic in the customer's most preferred category. If there are multiple most-preferred categories, indicated as ties in ccv, the objective content ratings can be used.

Alternatively, the customer may be required to input an upper limit $cvu_{ik}$ and a lower limit $cvl_{ik}$ for characteristic k to show his/her acceptable range for characteristic k, where $cv_{ik}$ is calculated as:

$$cv_{ik}=(cvu_{ik}+cvl_{ik})/2 \qquad \text{Equation (2)}$$

i.e., the middle point of the range. If customer i wants to indicate his/her indifference to characteristic k, i.e., that he/she can accept any level of characteristic k, then he/she may either let $cvu_{ik}=10$ and $cvl_{ik}=0$, or let $wv_{ik}=0$.

The initial value for $cp_{jk}$ is calculated as the mean of all votes on that characteristic by "experts" or other viewers used to characterize the video programs. As will be noted below, initial profiles for video programs may be obtained by using a panel of experts or customers to assign content profiles or by assigning the customer profiles to the video programs on the basis of those who liked the video program during a test screening. On the other hand, the initial value for $sv_{ik}$ is calculated as:

$$sv_{ik} = (cvu_{ik} - cvl_{ik})/Z, \quad \text{Equation (3)}$$

where Z preferably equals 2. The calculation simulates that for standard deviation, where the cutting point for rejection in normal distribution is usually when the divisor Z=2. Accordingly, cv is of point value, and sv is of range value. Thus, while the value of the divisor Z in Equation (3) may be altered to tighten/loosen the cutting point, the divisor in Equation (2) may not be changed. sp, on the other hand, may be calculated as the standard deviation in the experts' or test group's votes on cp.

The major advantage of Scheme B is that much burden will be taken away from the customer in the ballot completion process, since as a rule, the number of characteristics well exceed the number of categories. The disadvantage, however, is the inaccuracies due to the fact that not all the characteristics in the customer's favorite category are on the customer's most preferred level. The inaccuracy may be reduced by expanding the most-preferred categories to those with ccv values in a certain upper percentile, rather than with the maximum ccv values. The value of sv can be derived from the deviation of ccv's in the customer's most-preferred categories. To help the customers vote more consistently, each category is preferably accompanied by a list of keywords (i.e., characteristics that are relevant to the category).

Similarly, the content profile may be determined using questionnaires completed by a panel of experts or customers who determine the content of all video programming available for broadcast. The same scaling systems would be used as for the customer profiles. For statistical purposes, it is desired that the expert or customer panel be as large as possible. As will be noted below, once the system of the invention is in operation, the customer profiles of those who actually watch a particular video program during an initial screening by a sample group may be used to assign a content profile to that program for subsequent viewings. In such a system, those customers who watch the program from beginning to end will be presumed to have "liked" the program. The customer profiles of those who "liked" the program would then be combined to create the initial profile for that program. That program would then be ready for broadcast to all members of the network.

Alternatively, in the presently preferred embodiment, more sophisticated techniques are used to generate the initial content profiles. In the preferred embodiment, the content profile of a program is determined automatically from the word frequency of certain words in the text or on-line description of a program or the frequency of certain words in the closed captions of a television show, where such words are chosen as representative of certain categories. Of course, other simpler techniques such as one which simply determines the presence or absence of particular characteristics may be used within the scope of the invention.

The weighting of the characteristics in the customer and content profiles somewhat depends on how the profiles were determined initially. For example, the weighting of the customer profiles may be obtained directly from a questionnaire by asking the customer to appropriately scale (from 1–10) his or her preference for each characteristic. On the other hand, if the customer profile is assigned based on demographics, zip code, and the like, the average weights for other customers with the same demographics, zip code, and the like may be used. When more statistical techniques are used for creating the initial customer and content profiles, the weights may be determined mathematically as, for example, the reciprocal of the standard deviation of the characteristics. Of course, other weighting techniques may also be used.

C. Adjusting Customer Profiles

As noted above, the data from which the initial customer profile is derived may be obtained through ballot filling, whereby a number of characteristics are listed and the customer gives his/her preference rating (cv) and flexibility range (sv) for each characteristic. However, people often do not provide all of the necessary responses or the correct responses to such ballots or questionnaires. Similarly, when the initial customer profiles are assigned to new customers on the basis of demographics and the like, there is a substantial likelihood that the initial customer profile will need considerable adjustment. Moreover, the system should account for the fact that many people's tastes change over time. Thus, to ensure accuracy of the profiles, there must be some way to correct errors in the initial customer profiles and to adjust the customer profiles over time.

In accordance with the invention, a passive feedback technique is provided whereby the programming viewed by the customers are automatically monitored and used to adjust the customer profiles. That technique will be described in more detail in Section V below. This section will instead refer to an active feedback mechanism which will be referred to as a "rave review."

As noted above, one way to establish an initial customer profile is to show an unrated program or portion of a program to a target audience and to assign to the unrated program a combination of the customer profiles of those who actually watched the program or portion of the program from beginning to end or to assign ratings inputted by those who completed a survey. A similar technique may be used for error correction or for creating initial customer profiles. In particular, the customer is exposed to a series of short sections of different video programs. Each section is characterized by a few characteristics, and the assigned characteristic level of each of the characteristics is presented to the customer. The customer is then asked to state his/her most preferred level for the characteristic given the assigned characteristic level for the viewed section of the video program. For instance, if the level of "action" in a section of the movie "First Blood" is assigned a value of 8, the customer may give 4–6 as his/her acceptance range. On the other hand, if the customer strongly disagrees with the assigned characteristic level, he/she may provide his/her own estimation of the level of the characteristic in the presented program section and give his/her acceptance accordingly. Of course, the major advantage of such a "rave review" procedure over ballot completion is that instead of voting on an abstract concept, the customer now makes estimations based on concrete examples.

Since the customer may not be able to remember exactly his/her preferred level of a characteristic that he/she indicated in a previous review or in an original ballot or may not have known his or her assigned initial value for a characteristic, he/she may intentionally or involuntarily repeat the same level for the same characteristic in one review if that characteristic appears in more than one program section, even if that characteristic should not have the same level. Therefore, in a "rave review" a program section with a large variety of characteristics should be selected to avoid repetitions of the same characteristic across several video clips. In addition, the customer should be advised that while making level estimations he/she should concentrate on the features of the current program sections and forget his/her previous ratings.

As mentioned above, changes in a customer profile should be expected over time. In other words, the values of cv and sv obtained from the rave reviews typically will be different from the values specified in the original ballot and during previous rave reviews. In order to avoid dramatic changes in the values, the setting of the new values should take into consideration both the old and the new data. Thus, if x represents either cv or sv, $x^n$ is the value of x after period n (n "rave review" changes), and $y^n$ is the value obtained during time n, then:

$$x^n = y^n \text{ when } n=1 \quad \text{Equation (4)}$$

and $$x^n = x^{n-1} + (1/n)(y^{n-1} - x^{n-1}) \text{ when } n>1. \quad \text{Equation (5)}$$

Each y is obtained either from the customer's ballot or rave review, but typically $y^1$ is from the ballot data, and $y^l$, $l>1$, is from the rave review data. From the above equations, it follows that:

$$x^n = (1/n)\Sigma_1 y^1, \quad \text{Equation (6)}$$

i.e., the new value of x after the n iterations is equal to the average of all the n−1 previous data. The method is formally termed MSA, or Method of Successive Average. With this method, data at each iteration is equally accounted for in the final value. Any dramatic changes will be damped down, especially at later iterations (when n is large). This approach agrees with intuition, since a customer's profile should stabilize over time.

However, customers may have systematic bias in estimating their preferences. For instance, a customer may constantly underestimate or overestimate his/her preference rating for a characteristic. One way to detect the inaccuracy is to check if there are some customers who, when viewing various programs in rave reviews, constantly disagree with the content profile value for a particular characteristic and suggest disproportionately higher/lower ratings. If frequently the t values in the t significance test turn out to be insignificant despite their agreement, then it may be necessary to adjust the customers' ratings of the characteristic in question in the direction opposite to their suggestions.

Another way to make adjustments to the customers' combined ratings is through the clustering of customers. Customers are asked to give overall ratings for various programs. If a group of customers come up with very similar ratings for most of the programs in a category, it is assumed that the actual acceptance ranges for these customers for each characteristic relevant to the category forms a narrow distribution, i.e., their values are close to each other. However, if in the distribution of stated ratings, some outside values which are far away from the majority are seen, then the indication is that these outside values need to be adjusted.

There are are many algorithms to find outsiders in a population. For instance, all the values may be sorted in the ascending order of their absolute distances from the mean, and gaps searched for at the lower end. Those values that are located below the largest gap would be outsiders. For statistical validity, the mean and standard deviation of the population less the outsiders may be calculated and a t significance test conducted to determine if any of the outsiders belong to the population. Only those that do not belong will be subject to adjustment.

D. Adjusting Content Profiles

As discussed above, in a rave review, the customer may state his/her disagreement with the rating of a characteristic in a video program and put forward his/her own rating for each characteristic in the program. This provides a mechanism for adjustment of the content profiles.

In general, the present invention may use the ratings of experts or test groups as the reference base.

Generally, the calculation of the agreement scalar ac is based on the values of cp and sp. Since the values of cp and sp are used in calculating ac for all customers, any inaccuracy in their values will affect the final results for all customers. (By contrast, an inaccuracy in the value of a customer's cv and sv only affects the results for that customer.) By definition, customers collectively make ratings relatively closer to reality than any experts or test groups. In other words, the customer's rating is reality. For instance, if all the customers on the average tend to overestimate a particular characteristic (for one or all programs), then the experts' or test groups' objective ratings for that characteristic (for one or all programs) should be raised to agree with the customers' perceptions.

Again, MSA may be used for the content profile adjustment, letting x be either cp or sp and letting $y^n$ be the value collectively suggested in period n by the customers for the variable, where $y^n$ is defined as:

$$y^n = (1/I)\Sigma_i y^n_i, \quad \text{Equation (7)}$$

where $y^n_i$ is the value suggested by customer i during period n. By substituting y in Equation (5) into Equation (4), the $x^{n+1}$ value may be calculated. For customers who do not state disagreement, their $y^n_i$ may be set to $x^n$, i.e., the original content profile. Therefore, $y^n$ is the average of the customers' suggested value at period n. The resultant $x^{n+1}$ is the adjusted content profile after period n.

This method would be less useful if only the content profiles of a characteristic for individual programs may be adjusted. Often, the relative bias is systematic, i.e., as seen from the customer's side, the characteristic values may underestimate or overestimate the significance of a characteristic for programs of certain or all categories. This problem can also be addressed as follows.

For clarity in discussion, subscripts again will be used. $y_{jk}$ is the customers' average suggested rating for characteristic k for program j. The distribution of the customers' ratings is assumed to be normal. For simplicity, time subscripts are dropped. A t value significance test is then conducted as:

$$t_{jk} = (y_{jk} - cp_{jk})/S_{Yjk-CPjk} \quad \text{Equation (8)}$$

$$(i = 1, 2, \ldots, I; j = 1, 2, \ldots, J; k = 1, 2, \ldots, K)$$

where:

$$S_{Yjk-CPjk} = \sqrt{sv^2/(I-1) + sp^2/(M-1)}, \quad \text{Equation (9)}$$

and where:

$t_{jk}$ is the t value for significance of difference between the customers' suggested rating of characteristic k for program j and the corresponding assigned objective rating;

$S_{Yjk-CPjk}$ is the standard deviation between the distribution of $y_{jk}$ and that of $cp_{jk}$;

I is the total number of customers; and

M is the total number of "experts."

If $t_{jk}$ is significant for a pre-defined level (say 0.05) with degree of freedom of I+M−2, then $cp_{jk}$ is determined to be significantly different from $y_{jk}$. In that case, an adjustment in $cp_{jk}$ is necessary, and MSA is calculated to obtain the new $cp_{jk}$ from $y_{jk}$.

With the above method, only the assigned objective rating of a characteristic for individual programs is adjusted. In order to adjust the assigned objective ratings of a characteristic for all the programs in a category, the following is used:

$$T_{lk} = (1/J_l) \Sigma_j t_{j-lk} \qquad \text{Equation (10)}$$

where:

$T_{lk}$ is the average of the t values for characteristic k in all the programs for category l;

$t_{j-lk}$ is the t value for significance of the difference between the customers' suggested rating of characteristic k for program $j_l$, and the corresponding objective rating; and $J_l$ is the number of programs in category l.

If an adjustment of the assigned objective rating of a characteristic over several or all categories is desired, the t values of an even wider range are averaged. For instance, if it is necessary to make an adjustment for all categories, calculate:

$$T_k = (1/L * \Sigma_l J_l) \Sigma_l \Sigma_j t_{j-lk}, \qquad \text{Equation (11)}$$

where:

$T_k$ is the average of the t values for characteristic k in all programs.

When a content profile value cp is changed to cp', it is also necessary to change the corresponding sp (deviation in cp) to sp'. Because there is a distribution in cp, there must be some expert(s) whose rating(s) is below or above the mean (cp). If through the above calculation cp overestimates/underestimates reality, it is assumed that only those experts whose ratings are above/below the mean made an overestimation/underestimation. Therefore, after the adjustment, the new deviation sp' should be smaller than sp.

One possible calculation of sp' is:

$$sp' = sp/(1 + \alpha * |cp' - cp|/cp) \qquad \text{Equation (12)}$$

Since cp>0, sp'<sp (i.e., sp always declines after adjustment). If α=1, cp=3, cp'=4, and sp=1, then sp'=0.75. The parameter a thus determines the rate of decreasing in sp with the rate of change in cp.

It should be pointed out that before making actual changes to content profiles determined by experts or test groups, it is desirable to consult with the experts or test groups for the proposed changes. That will not only preclude any unreasonable changes, but also will reduce possible future bias by the experts or test groups.

E. Customer Moods and Time Windows

Few people are purely single minded, especially when enjoying entertainment. Besides a generic propensity, it is therefore reasonable to assume that each customer could have one or more viewing moods, and in each of the moods he/she would like to watch a particular set of program categories. For normal and not highly capricious people, the moods should be time-specific, i.e., each mood has a time window, within which the mood is effective.

On the other hand, people are not free all the time. The time when they can enjoy entertainment is limited. The time window concept can be used to represent this temporal limitation as well. Thus, each time window can be expressed as a pair of time variables, l and u, where l is the starting point of the window and u is the ending point of the window. Customer profiles used in accordance with the preferred embodiment of video scheduling preferably incorporate this concept of moods and time windows.

In the present invention, each customer preferably has a generic mood and may also have some specific moods. Both generic moods and specific moods may or may not be time-specific. In fact, a non time-specific mood can also have a time window, only with l=u, i.e., its window covers the whole day. Typically, for a particular customer, the time window for his/her generic mood will have the greatest width, and the width of the windows for his/her specific moods will decrease with an increase in specification. In this sense, all the moods of a customer form a tree, in which the generic mood is the root, and a specific mood becomes the child of another mood if the former's window is contained in the latter's window. For example, if a customer has four moods: generic, peaceful, violent, speculative, the generic mood may cover all times, the violent mood may cover 6 a.m. to noon, the peaceful mood 6 p.m. to midnight, and the speculative mood from 8 p.m. to midnight. Thus, the speculative mood is a child (subset) of the peaceful mood. The mood at the lowest (most specific) level of the hierarchy is generally used to develop the program list for the customer (described below).

The definition of moods can be the responsibility of the customer. When ballots are used to create the initial customer profiles, each ballot may correspond to a mood. In other words, a mood may be equivalent to a customer profile. The generic mood or generic customer profile is required unless there is an automatic system default mood or profile. Beyond that, the customer can fill out as many ballots as he/she likes to establish specific moods.

A satisfaction factor, sf, is attached to each mood. For the generic mood, sf=1, which is the base. sf increases as the time window narrows since it is reasonable to believe that people get greater satisfaction as their more specific requirements are met. sf is either determined by the customer or takes a default value. For instance, the system may set a maximum value on sf for the most specific window, which is two hours wide, and do a linear interpolation to find the sf values for windows of greater widths. If the customer provides the sf values for his various mood windows, the values will be normalized in light of the base value of one and the above-mentioned system-set maximum value.

With the introduction of time windows, each customer i (or customer-mood i, to be more accurate) will take on time window superscripts as $i^{l-i, u-i}$, while each program j will become $j^{l-j, u-j}$, where $l_j$ is the starting time of program j and $u_j$ is the ending time of program j. The calculation of the agreement scalar ac then proceeds as will be described in the next section. However, the calculation of as, the final objective value, becomes:

$$as_{ij} = sf_i * [wc_i * ac_{ij} - wf * f(l_i, u_i, l_j, u_j)], \qquad \text{Equation (13)}$$

where $f(l_i, u_i, l_j, u_j)$ gives a punishment value expressing the customer's dissatisfaction due to the mismatch between the time window of customer-mood i and the broadcast time of program j, $sf_i$ is the normalized satisfaction factor of customer-mood i, $wc_i$ is the weight for the existing agreement scalar, and wf is the weight for f, which needs to be determined through practice.

The major issue here is the form of the punishment function f. Intuitively, f=0 when the mood window contains the broadcast window, i.e., $l_i \leq l_j$, and $u_i \geq u_j$, and f increases as the two windows move away from each other. Since $u_i - l_i \geq u_j - l_j$, i.e., the mood window is not narrower than the broadcast window, the time discrepancy d between the two windows may be expressed as:

$$d = \max(0, l_i - l_j, u_j - u_i), \qquad \text{Equation (14)}$$

So f=f(d).

It is reasonable to expect that the customer's dissatisfaction increases rather sharply when the mismatch of the time windows first begins, which means he/she will miss some part of the program. But when the time mismatch increases further, the customer's discontent will level off. For example, the customer will feel quite upset if he/she misses the beginning ten minutes of a program which he/she likes. However, if he/she has already missed the first one hour and a half, his/her dissatisfaction will not increase much if he/she misses the remaining half an hour. This non-linear relationship can be well expressed by the following negative exponential equation:

$$f(d) = \alpha(1 - e^{-\beta d}),\qquad\text{Equation (15)}$$

where $\alpha$ is the maximum dissatisfaction that a customer could have for missing a program, and $\beta$ is a parameter which determines how sharply f(d) increases with d. The greater the value of $\beta$, the steeper the curve would be. It can be seen through Equation (15) that f(d)=0 when d=0, and f(d)=$\alpha$ when d=$\infty$. Thus, the punishment function becomes:

$$f(l_i, u_i, l_j, u_j) = \alpha(1 - \exp(\max(0, l_i - l_j, u_j - u_i))).\qquad\text{Equation (16)}$$

Given the form of Equation (13), a may be set to one since the extent of dissatisfaction can be adjusted by the weight parameter wf.

III. Calculation of Agreement Matrix

The calculated agreement scalars, ac, form an agreement matrix, AC, which provides measurements of the similarity between the customer profiles and the content profiles. Its calculation incorporates the desired amounts of the various characteristics used to define the programs, their importance (weights) to each customer, and the amounts of these characteristics present in each program as determined by experts or test groups. Assuming there are I customers, J programs, K characteristics, and M experts, then each cell in the initial agreement matrix (agreement scalar for $cv_{ik}$ and $cp_{jk}$) may be calculated as:

$$ac_{ij} = 1 \Big/ \left[ 1 + (1/K)\sum_k (wv_{ik}/W_i) t_{ijk} \right]\qquad\text{Equation (17)}$$

$$(i = 1, 2, \ldots I, j = 1, 2, \ldots J),$$

where:

$$t_{ijk} = |(cv_{ik} - cp_{jk})|/s_{CVik-CPjk},\qquad\text{Equation (18)}$$
$$= \infty,$$
if $cv_{ik} >= 0$
if $cv_{ik} = -1$
$(i = 1, 2, \ldots, I; j = 1, 2, \ldots, J; k = 1, 2, \ldots, K)$ and:

$$s_{CV_{ik}-CP_{jk}} = \sqrt{sv_{ik}^2/(N) + sp_{jk}^2/(M-1)}\qquad\text{Equation (19)}$$

and:

| | |
|---|---|
| $ac_{ij}$: | agreement scalar between the profiles of customer i and that of program j; |
| $t_{ijk}$: | t value for significance of difference between the rating of characteristic k in customer i and that in program j; |
| $s_{CVik-CPjk}$: | standard deviation between the distribution of $cv_{ik}$ and that of $cp_{jk}$; |
| $W_i$: | $\Sigma_k wv_{ik}$, i.e., the sum of all weights for customer i; |
| M: | number of "experts" who rate program j; and |
| N: | number of times of consideration before the customer reaches a final decision on the rating for cv. |

The magnitude of each of the t values shows the deviation of the customer's ratings of a characteristic from that of the video program given the distributions of the ratings by both the customer and the experts or test group. If the t value is significant at a predetermined level of significance, e.g., 0.05 for degree of freedom of 2M−2, then the two distributions could be regarded as belonging to the same population. The average of all the t values can serve as an indicator of the divergence (distance in characteristic space) between the profile of the customer and that of the program. Therefore, the variable ac, which is basically the reciprocal of the average of the t values (reciprocal of the distance), exhibits the level of agreement between the two profiles. Thus, ac$\in$(0,1) and reaches its maximum value of 1 (perfect agreement) only when $\Sigma_k wv_{ik}*t_{ijk}=0$ or $wv_{ik}*t_{ijk}=0$ (i=1,2, ..., I; j=1,2, ... ,J; k=1,2, ... ,K) since $wv_{ik}>=0$ and $t_{ijk}>=0$. In other words, perfect agreement will be met only when there is no difference between the customer profile and the content profile, or when there are differences only on certain characteristics and the customer ignores those characteristics. As a result, sorting all the programs in the ascending order of ac renders a recommendation list of programs for the customer.

In the original formulation of the t significance test, both M and N are the sample sizes. While M is the number of experts or members in the test group, N represents the number of times of consideration before the customer reaches his/her final decision on the rating for cv. N's value may be determined empirically through experiments. Generally speaking, the higher N's value, the lower the flexibility in the customer's acceptance for various characteristics on average. Preferably, N=M−1 so that dispersions in cv, which is interpreted as the customer's acceptance range, and in cp, which represents the difference in the experts' voting, are equally counted. This calculation is underpinned by the assumption that both the distributions of the experts' vote and the customer's rating are normal (Gaussian). Although the assumption is not guaranteed, that is the best that can be hoped for.

Once the initial customer profiles and initial content profiles have been established, a simpler form of Equation (17) may be used by combining wv and s into a single measure of importance:

$$w_{ik} = wv_{ik}/(1/J)\sum_j s_{ijk},\qquad\text{Equation (20)}$$

where:

$$s_{ijk} = \sqrt{sv_{ik}^2/M + sp_{jk}^2/M},$$

where $sv_{ik}$ is the spread in customer i's rating for characteristic k (inversely correlated with the importance of k to i), and $sp_{jk}$ is the spread in the experts' ratings for characteristic k. Thus:

$$ac_{ij} = 1/[1 + \Sigma_k w_{ik}|cv_{ik} - cp_{jk}|], \quad \text{Equation (21)}$$

This simpler notation is preferred and will be used throughout the discussion below. However, the algorithms described below are all easily extended to the more complex model of Equation (17). Generally, the more complex form of the agreement matrix (Equation (17)) is only preferred when the customers are asked questions to build their customer profiles. The simpler form of the agreement matrix (Equation (21)) is preferred when the profiles are initialized using demographics and updated using passive monitoring, as in the presently preferred implementation of the present invention.

For purposes of illustration, a calculation of a simple agreement matrix will be described here.

It is assumed that there are only two customers: (1) John and (2) Mary. Their sample customer profiles are as follows:

|  | romance | high-tech | violence |
|---|---|---|---|
| characteristic (cv) : | | | |
| 1 John | 3.0 | 9.0 | 7.0 |
| 2 Mary | 9.0 | 3.0 | 0.0 |
| standard deviation (sv): | | | |
| 1 John | 1.0 | 2.0 | 1.0 |
| 2 Mary | 1.0 | 0.5 | 0.0 |
| weight (wv) | | | |
| 1 John | 2.0 | 9.0 | 5.0 |
| 2 Mary | 8.0 | 3.0 | 7.0 |

The available programs are as follows:

| | Program Titles |
|---|---|
| 1 | Star Trek |
| 2 | Damnation Alley |
| 3 | Forever Young |
| 4 | Terminator II |
| 5 | Aliens |
| 6 | Fatal Attraction |

The sample content profiles are as follows:

|  | romance | high-tech | violence |
|---|---|---|---|
| \ char. (cp): program\ | | | |
| 1 Star Trek | 2.0 | 9.0 | 4.0 |
| 2 Damnation Alley | 5.0 | 0.0 | 1.0 |
| 3 Forever Young | 8.0 | 3.0 | 0.0 |
| 4 Terminator II | 0.0 | 10.0 | 8.0 |
| 5 Aliens | 0.0 | 8.0 | 9.0 |
| 6 Fatal Attraction | 7.0 | 0.0 | 8.0 |
| \ standard deviation (sp): program\ | | | |
| 1 Star Trek | 0.5 | 1.0 | 1.0 |
| 2 Damnation Alley | 1.0 | 0.0 | 1.0 |
| 3 Forever Young | 1.0 | 0.5 | 0.0 |
| 4 Terminator II | 0.0 | 1.0 | 1.5 |
| 5 Aliens | 0.0 | 1.0 | 1.0 |
| 6 Fatal Attraction | 2.0 | 0.0 | 1.0 |

After normalizing w using:

$$W_{ik} = WV_{ik} \Big/ \left(\sum_j S_{Cv_{ik} - cp_{jk}} / J\right) \quad \text{Equation (22)}$$

where $s_{CVik-CPjk}$ is defined in Equation (19), the above input data produces the following weight matrix (w):

| customer \ | \ characteristic: | | |
|---|---|---|---|
| | romance | high-tech | violence |
| 1 John | .166 | .425 | .409 |
| 2 Mary | .292 | .192 | .516 |

Given the weight matrix and the characteristic profiles of the customers and the programs, the agreement matrix may be calculated. For example, the agreement scalar between customer 1 and program 2 is:

$$ac_{12} = 1/(1 + w_{11}|cv_{11} + cp_{21}| + w_{12}|cv_{12} + cp_{12}| + w_{13}|cv_{13} - cp_{23}|)$$
$$= 1/(1 + .166*|3-5| + .425*|9-0| + .409*|7-1|)$$
$$= .131$$

The final agreement matrix (AC) is thus:

| Customer \ | \ Program | | | | | |
|---|---|---|---|---|---|---|
| | 1 | 2 | 3 | 4 | 5 | 6 |
| 1 John | .418 | .131 | .138 | .429 | .365 | .170 |
| 2 Mary | .160 | .307 | .774 | .110 | .108 | .159 |

From the agreement matrix, it is evident that John prefers "Star Trek", "Terminator II", and "Aliens", while Mary prefers "Forever Young" and "Damnation Alley". This is the results that would have been expected from the profiles, only here the preferences have been quantified.

Of course, in the simple case where merely the presence or absence of particular characteristics are measured, the agreement matrix would look for identity in the most categories rather than the distance between the customer profile vector and the content profile vector using the techniques described above.

IV. Scheduling Video Delivery in Accordance with Customer and Content Profiles

The introduction of time dimensions makes possible the scheduling of video programs, i.e., the assignment of programs to days and to time slots in accordance with each customer profile.

A. Scheduling Constraints

Solving the problem of assigning days and time slots simultaneously is often impractical because of the exponential increasing order in the number of possible combinations.

Therefore, the two tasks are preferably performed separately through heuristic methods.

The first task, assigning programs to days, is simplified significantly by the fact that in the present system the customers' preferences are differentiated mostly by time slots (hours), rather than by days. When the customer defines weekday mood time windows, it is assumed that the window will apply to any weekday. Of course, the customer may define some weekend time windows, which apply to either Saturday or Sunday. Therefore, for a given set of programs available for a week, the major question is not on which day to broadcast them, but during which hours to broadcast them.

A possible approach to scheduling is that for each program its top n most-preferred broadcast windows are determined from the average of the objective values as calculated using Equation (13). The scheduler then uses some methods to find a solution in which the average objective value reaches a reasonably high value, and in which the time slots are covered. There are many such methods available, such as integer linear programming.

An extra complexity is the possible necessity of repeating some programs during a day or a week, because of their high popularity. A simple approach is to let the scheduler first determine the number of necessary repetitions, and then add the number in as constraints in the programming. However, it should be noted that the above approach is for just one channel. If there are multiple channels, then it is usually necessary to first categorize the channels, find their respective "target audience", and then run the scheduling procedure on the target audience of each channel.

Attention should also be paid to the mutual exclusion among the overlapping time windows of a customer. Although the customer may define time windows which conflict with each other, in terms of overlapping and containment, only one of the windows in the conflicting set can be used in the final assignment. This condition should be added to the constraints.

B. Scheduling Algorithm

With the above scheduling constraints in mind, the present inventors have developed an algorithm which uses customer profiles and content profiles for scheduling the broadcast of movies and other shows over a video distribution network which allows the simultaneous distribution of many channels from a head end to the set top multimedia terminals associated with many customers' television sets. The same approach is then used to develop "virtual channels" at the set top multimedia terminals based on domain or genre or tastes of individuals so that the customer can view the video programming predicted to be most desirable to that customer. The "virtual channels" may be displayed on dedicated channels, or the recommended programming may be highlighted directly on the electronic program guide or displayed on the customer's screen as recommended programming selections. Also, the channels may be reprioritized for presentation on the electronic program guide on the basis of the calculated "virtual channels." Similarly, video programming of a particular type, even if not part of the "virtual channels" may be highlighted on the electronic program guide as desired. The algorithm for determining the recommended programming is based on the above-mentioned "agreement matrix" which characterizes the attractiveness of each movie and video program to each prospective customer. In short, a broadcast schedule and/or virtual channel is generated which is designed to produce the greatest total customer satisfaction. The generation of the agreement matrix and the scheduling of programs in accordance with the generated agreement matrix will now be described in more detail.

As described above, the agreement matrix may be produced by comparing the customer profiles and the content profiles. In the following description, it is assumed that the agreement matrix is normalized so that all agreements between customers and movies lie between zero and one.

The basic problem of scheduling a cable television broadcast can be formulated as follows.

Given an agreement matrix A where $ac_{ij}$ is the agreement scalar between customer i and program j, find:

$$\max \sum_i \sum_j ac_{ij} \qquad \text{Equation (23)}$$

$$J \in N_i$$

where J is; a set of programs to be broadcast drawn from a set Q of candidate programs available for broadcast, the first summation is over all customers i, and the second summation (of j) is over the $n_i$ programs in the set of programs $K_i$ that customer i would most desire to watch. In other words, given the agreement matrix between customers and programs, it is desired to pick the set of programs which maximizes the agreement between customers and those programs which the customers might watch. For example, if a hundred programs are being broadcast and a given customer would not consider more than five of them, it does not matter how much the customer likes the other ninety-five programs. However, as noted above, the actual problem can be much more complex, since different agreement matrices can depend on the time of day and since multiple time slots cannot be scheduled independently.

If only one program were to be broadcast using the method of the invention, the above optimization problem is trivially solved by summing each column of A (calculating $\Sigma_i \, ac_{ij}$) and picking the program j which gives the largest value. When many programs are being selected, however, it is not possible to try all possible combinations; therefore, heuristic methods must be used.

The following algorithm is an example of a greedy algorithm which provides an efficient algorithm for approximately solving the above scheduling problem including the fact that it is desired to select ni programs for each customer i (the "viewing appetite"). In other words, $n_i$ represents the number of programs scheduled for broadcast to a particular customer at any time. In a preferred embodiment, $n_i$ corresponds to the number of "virtual" channels available to each customer.

Figure 2:
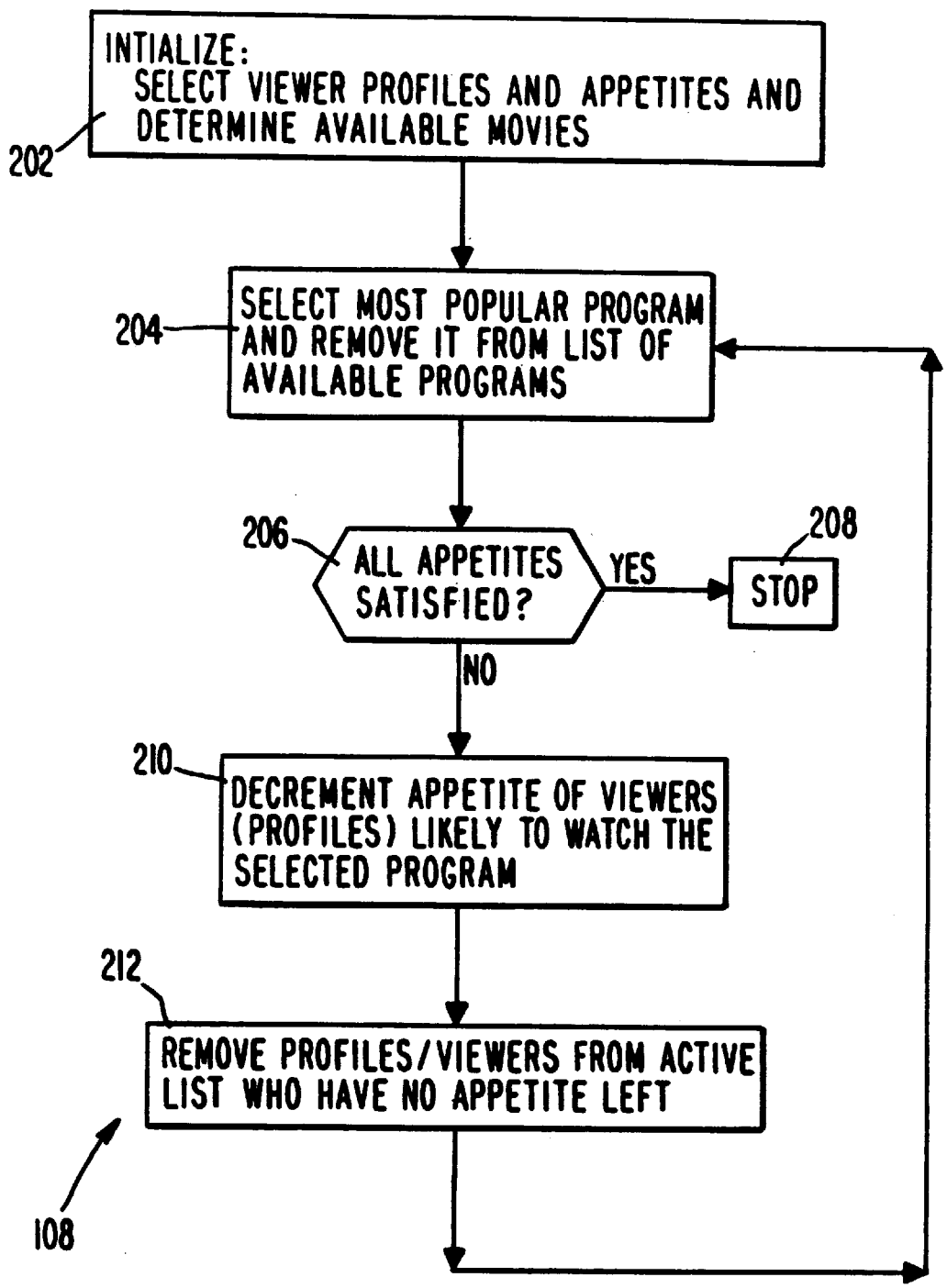
FIG. 2 is a flow chart illustrating the method of selecting the contents of channels which are to be transmitted from a CATV head end to a plurality of customers in accordance with the invention.

In accordance with the invention, the "greedy" scheduling algorithm will function as follows. As illustrated in FIG. 2, at each step of the algorithm:

1) Pick the program j which yields the greatest satisfaction summed over the current customer population (i.e., those eligible to receive program j).

2) Decrement the viewing appetite $n_i$ of those customers who have the greatest agreement scalars with the currently selected program.

3) Remove from the customer population any customers whose viewing appetite has dropped to zero ($n_i=0$), since they have all the shows they need and hence are not a factor in selecting further shows.

The scheduling process stops when the number of programs selected, m, equals the number of broadcast channels available, M, for the schedule time.

A more precise description of the process may be described in pseudocode as:

0) Initialize:

| | |
|---|---|
| Let $ap_i = n_i$ for all i | set all customers' appetites to $n_i$ |
| Let V = {1} | initialize the customer population to include all customers |
| Let m = 0. | start with no programs selected |

As described below, different initializations are possible to account for programs which will always be broadcast. Also, if individual appetites are not available, all can be set to a single value, n.

1) Select the currently most popular program:

| | |
|---|---|
| Select program j which gives max $\Sigma_{i \text{ in } V} ac_{ij}$ | |
| Let m = m + 1 | increment number of programs selected |
| If m = M, stop, | stop if done | otherwise proceed to (2).

2) Decrement the appetite of those customers who like the currently selected program:

Select the customers i in V for which $ac_{ij}$ is above a threshold value $\alpha$. Then decrement the appetites for selected customers by letting $ap_i = ap_i - 1$.

3) Remove customers from the current customer population V who have no appetite left:

Remove from V customers j for whom $ap_{ij} = 0$. Go to (1). This method automatically produces a schedule in which a variety of programs are selected according to the spread of customer interests. Note that the simpler algorithm of selecting the most popular programs (those with highest agreement matrices) will not produce acceptable results, for if a majority of customers prefer action films, then only action films would be selected, leaving the minority of customers with no films that they find attractive.

Figure 3:
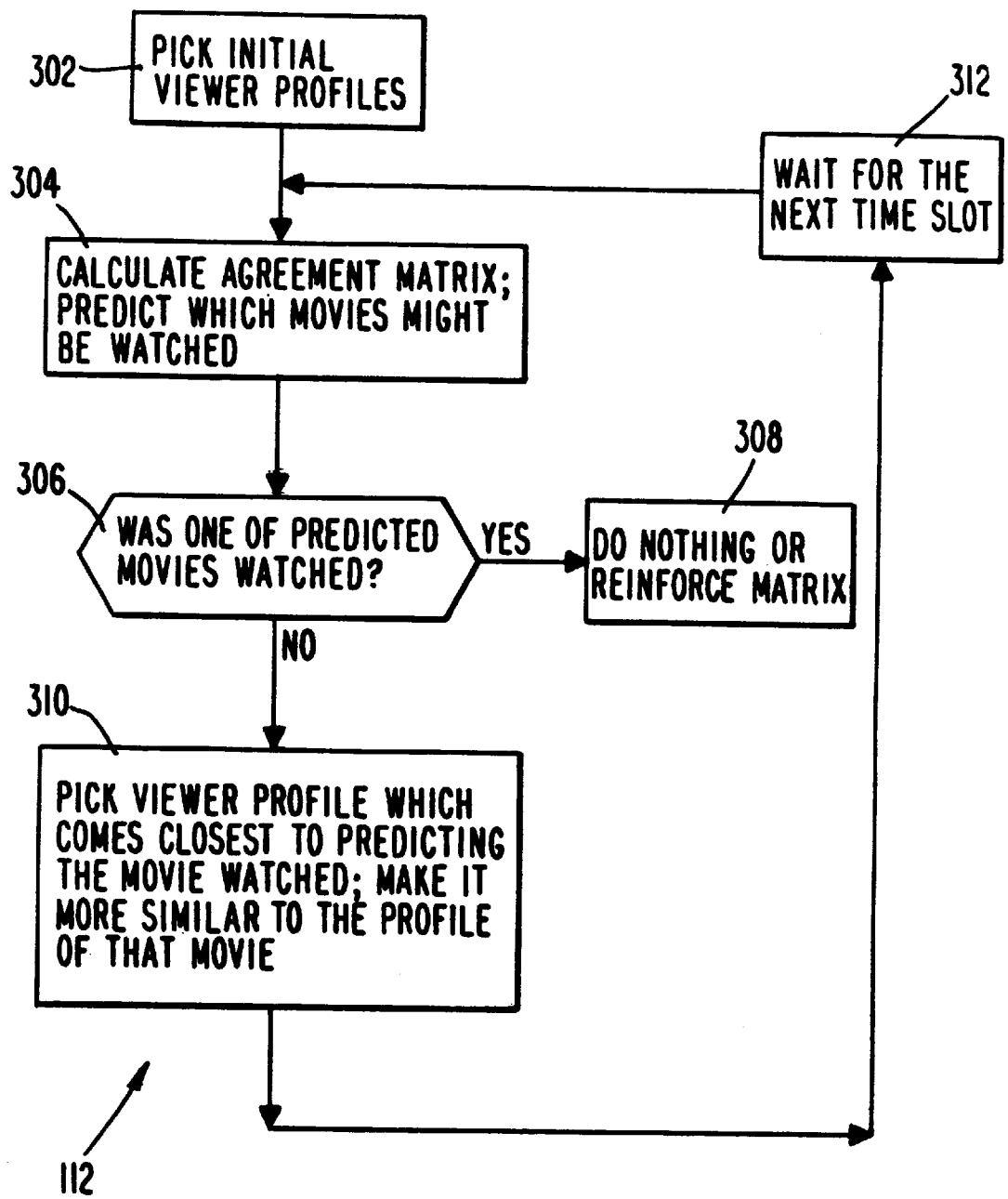
FIG. 3 is a flow chart illustrating the method of passively updating customer profiles in accordance with the invention.

FIGS. 1–3 summarize the above-mentioned procedures for establishing customized channels of preferred programs in accordance with the invention.

As illustrated in FIG. 1, a schedule of available shows and their characteristics (content profiles) is created and stored in a database at step 102. As noted above, the characteristics of the shows may be determined by "experts" or test groups by completing questionnaires and the like, or the content profiles may be generated from the frequency of usage of certain words in the text of the video programs (the on-line descriptions or the script). Alternatively, the content profiles may be determined by combining the customer profiles of those who "liked" the video program during a "rave review." Preferably, the content profiles are downloaded all at once for a given time period along with the corresponding scheduling data as part of the electronic program guide data and sent via a separate data channel. On the other hand, the content profiles may be transmitted as part of the bit stream of the video program (for digital transmission), in the vertical blanking intervals of the video program (for analog transmission), or by other appropriate means.

At step 104, the customers' preferred characteristics (customer profiles) are created and stored in a database. As noted above, the customer profiles represent the customers' preferences for the program characteristics and preferably differ in accordance with the time of day to account for different moods of the customer and different customers within each household. In a preferred embodiment, the customer profiles for each household are stored in the set top multimedia terminal for that customer's household.

The content profiles received with the electronic program guide data are preferably stored at the set top multimedia terminal and compared by the set top multimedia terminal to the customer profiles for each customer. An agreement matrix is then created at step 106 using the techniques described above. Once the agreement matrix has been generated, those programs with the highest values for ac, i.e., the closest distance (1/ac) and hence closest match to the customer's profile or profiles, are prioritized and selected for presentation as "virtual channels" (in the case of creating "virtual channels" at a set top multimedia terminal) or as the programming channels (in the case of scheduling video programming at the CATV head end) at step 108. This process is described in more detail herein with respect to FIG. 2.

In a simple embodiment of the invention in which no feedback is used to update the customer profiles, no further activity is necessary. However, it is preferred that the customer and/or content profiles be updated to allow for changes in the customers' preferences as well as to correct errors in the original determinations of the profiles. Accordingly, at step 110, the customers' set top multimedia terminals maintain a record of the video programs that are actually watched by the customer for a period of time (say, 10 minutes) sufficient to establish that the customer "liked" that program. Of course, the monitoring function may be selectively activated so that the profiles are not always updated, as when a guest or child takes control of the television at an unexpected time.

Finally, at step 112, the customers' profiles are updated to reflect the programs actually watched by the customers. Such updating techniques are described above and further below with respect to FIG. 3.

FIG. 2 illustrates a technique for selecting video programs for "virtual channels" at the customers' set top multimedia terminals or, alternatively, for scheduling video programming at the head end from the available video programming sources. As illustrated, the method is initialized at step 202 by determining which customer profile or profiles are active for the time period to be scheduled, by determining the customers' appetites (number of channels available for transmission), and by determining the database of video programming from which the schedule may be created. For example, at the head end, the video programming database may be any video programming available for transmission during the designated time frame, while at the set top multimedia terminal, the video programming database comprises only the video programming on those channels which the customer is authorized to receive.

Once the agreement matrix for the available video programs has been determined, at step 204 the most popular programs for a single customer (at the set top multimedia terminal) or a cluster of customers (at the head end) are selected and removed from the list of available programs during the relevant time interval. Of course, in the case of scheduling at the set top multimedia terminal, the video programs scheduled onto "virtual channels" are still received on their regular channels and the "virtual channels" are assigned to unused channels of the set top multimedia terminal. At step 206, it is then determined whether the customer's appetite is satisfied (at the set top multimedia terminal) and whether all the customers' appetites are satisfied (at the head end). If all relevant appetites are satisfied, the scheduling algorithm is exited at step 208. On the other hand, if all customer appetites are not satisfied, the appetites of the customers likely to watch the selected program are decremented at step 210. Hence, only those customers with preferences which relatively "match" the characteristics of a particular video program have their appetites decremented. At step 212, those with no appetites (channels for scheduling) left are removed from the scheduling list. The process is then repeated starting at step 204 for those with channels left to schedule.

When establishing "virtual channels" in accordance with the invention, it is important to know which customer profile or profiles to use in creating the agreement matrix. In a preferred embodiment, this is accomplished by using the customer profile or combination of customer profiles which are given priority during a particular time interval for a predicted customer mood. This determination is made independent of the person actually viewing the television. However, the system of the invention may be easily modified to permit the customer to identify himself or herself by providing a user ID to the set top multimedia terminal so that a particular profile of that customer may be selected in the determination of the agreement matrix. In other words, customer names may be matched to particular profiles based on selections made when that customer's user ID has control of the television. In addition, combined profiles may be created which best reflect the combined viewing tastes of several persons in the same household. On the other hand, the system may come with preselected profiles which the customer may select to use as his or her initial profile. After a certain amount of time, the system would recognize a particular profile as belonging to a particular viewer or combination of viewers so that it would eventually be unnecessary for the customers to input their user IDs. In other words, the system would "guess" which customers are viewing by noting which customer profile is closest to the shows being selected. Of course, this latter approach requires the customer profiles to be matched to individuals rather than just time slots as in the preferred embodiment.

FIG. 3 illustrates a preferred technique for updating customer profiles in accordance with the invention. As illustrated, the initial customer profiles are selected at step 302 using any of the techniques described above. At step 304, the agreement matrix is calculated to determine which video programs the customer might desire to view in the selected time period. Then, at step 306, the passive monitoring feature of the invention is invoked to determine if the customer actually watched the video program selected from by the agreement matrix. If the customer watched the predicted program, then the customer profile is presumed accurate at step 308 and no adjustment is made. Of course, the customer profile may be positively reinforced by varying the adjustment increment. However, if the customer did not watch the predicted video program, the customer profile for the appropriate time interval is selected at step 310 which has characteristics closest to those of the video program actually watched. That customer profile is then adjusted using the techniques described above. The adjusted profile is then considered valid until the next time slot is encountered at step 312. The agreement matrix is then recalculated at step 304 for the new customer profiles and video programs offered in the next time slot.

Particular hardware implementations of the invention in a set top multimedia terminal and/or a video head end will be described in Section VI below.

C. Scheduling Variations

Many variations to the above generalized scheduling scheme are possible within the scope of the invention. The following variations may be used by those skilled in the art, but, of course, this list is not comprehensive.

A. Special programs such as standard network broadcasts may be included in the scheduling. In this embodiment, when certain programs have already been scheduled for broadcast, such as standard network programs or specially selected popular movies, the above algorithm is modified to account for the effect of these programs on customer interest in the remaining video programming. This is easily done by initially running the above algorithm with step (2) modified to simply include the prescheduled programs rather than selecting new ones. When all prescheduled programs have been "scheduled" (i.e., customers likely to watch the pre-scheduled programs have been removed from the customer pool and the broadcast slots have been filled), then the scheduling algorithm proceeds as usual. As desired, this will lead to additional movies being selected which will appeal most to customers who will probably not be watching the standard network broadcasts.

B. The effect of recent broadcasts may be included in the scheduling. The above scheduling algorithm is presented for a single time slot. In actuality, the video programs selected must depend on which other video programs have been shown recently. This can be done in several ways. For example, one can remove recently shown movies from the list of movies available to broadcast. Alternatively, one can remove recently shown movies from the list of movies available to broadcast when their popularity (number of customers per broadcast) drops below a threshold. This approach is better in that it allows new hits to be broadcast multiple times. More complex models may explicitly include a saturation effect by shifting the agreement matrix based on the number of similar video programs recently viewed.

C. The effect of overlapping time slots, such as so-called "near video on demand" may be included in the scheduling. For this purpose, the above algorithm can be modified to account for the fact that popular video programs may occupy more than one time slot and that time slots may overlap. As an extreme example, it may be desirable to offer multiple overlapping broadcasts of a popular movie on vacant channels, e.g., at 15 minute intervals. In this example, the customer appetite concept set forth above would be augmented by a more sophisticated model which includes the fact that customers turn on the television at different, possibly random times, and only want to watch shows which are starting at times close to the time they turn on the television.

D. The effect of moods may be included in the scheduling. If one has different agreement matrices for different customer moods (either reflecting multiple customers with different tastes using the same television or reflecting one customer having different viewing preferences due to moods), the above algorithm can be trivially extended. The different moods are just treated as different customers, with the appetite for each mood selected to be proportional to how often that mood occurs in the time slot being scheduled. This will result in programs being scheduled for each of the potential moods; the customer can then pick his or her preferred show.

E. Programs may be matched to channels for scheduling content based channels. Customers may prefer to have channels which have a consistent content or style (e.g., sports or "happy" shows). The basic algorithm presented above could be modified so that some slots are reserved so that shows of a given type (e.g., close to a given set of characteristics typical of a channel) can be selected if they have not already been chosen in the main scheduling algorithm.

F. How the customer appetites are decremented may be selected for scheduling purposes. In the above scheduling algorithm, whenever a program is chosen, the viewing appetite of all its "audience" is decremented, and those who have used up their appetites are removed from the viewing population. Since the checking of viewing appetite is made only of the audience of the currently chosen program, the outcome of the scheduling process depends in part on the definition of audience—who will potentially watch the program. Above it was assumed, for simplicity, that customers should be included in the potential audience if their agreement with the program was above a threshold. However, many variations on this are possible. For example, one could pick a fixed audience size for each show. For example:

Select the $n_w$ customers i in V for which $ac_{ij}$ is maximum. $n_w$ can be calculated, for example, as $n*I/M$ as the average customer appetite, n, times the number of customers, I, divided by the number of programs, M, to be broadcast. One could also make the threshold a variable, either by decreasing the threshold or the number of customers $n_w$ over the course of developing a schedule so that the first programs scheduled would have large audiences, while the last programs scheduled (those done after most customers needs are satisfied) would have smaller audiences. Ideally, this would be done in accordance with observed audience size distributions.

G. The lead-in effect may be included in the scheduling. The algorithm could be modified to account for higher viewing levels in shows which follow immediately after popular shows (the "lead-in" effect). As described above, this can be accounted for by treating errors in predicting customer behavior differently if they result from the customer remaining tuned to a channel.

H. The effect of repetitive showings may be included in the scheduling. Since viewership is a strong function of the time of day and of the day of the week, one cannot assess the popularity of a show based on the number of people watching it without controlling for the time slot. Similarly, movies shown at the same time as very popular programs or as very similar programs tend to have fewer viewers—the audience will be divided. The algorithm given above does not rely on absolute viewership numbers and so does not have these problems.

Similarly, when many similar programs are shown over a short span of time, there is viewer "burnout". In other words, if the same movie is shown repeatedly over the course of a month, it will get fewer viewers on later showings. As another example, if many golf programs are broadcast during a week, each customer's desire to watch golf will saturate, and viewership will decay. Predictions of what a customer will want to watch only makes sense if they have not watched the same (or almost identical) show recently. Thus, changes to the customer profiles and content profiles should not be made if, for example, a customer does not select a movie to watch which they recently watched. However, depending on the indexing scheme used to store viewing habits, checking to see if a similar program was recently watched, while straight forward, may require a significant amount of database search.

I. Customer profiles can be modified on an individual basis. Since different people often watch the same television, and most feedback devices in popular use do not recognize which customers are present, customer preferences cannot be characterized by a single agreement matrix. Also, customers may have different agreement matrices depending on their mood. If more than one agreement matrix per television is initially estimated (e.g., by interviewing multiple customers), then the above algorithm can be modified to only count a prediction as wrong if none of the agreement matrices for a given television yields predictions that agree with what was actually watched. One or more of the agreement matrices for the television could then be updated using the algorithm. This is not ideal, in that one does not know which mood (or customer) was present, but the best that one can do is assume that it was the mood (customer) whose agreement matrix came the closest to giving the correct prediction. On the other hand, the customer may simply identify himself or herself when the television is turned on, and preferably, may specify which profile to use based on who is present and/or the customer's mood.

All of these effects can be taken into account in developing customer profiles and content profiles and in scheduling video programs in accordance with the invention.

V. Passive Characterization of Customers Using Feedback

Thus far, the invention has been described in the context of a "filtering" system in which all of the video programming available at the head end is scheduled on "customized" channels in accordance with the customer profiles of customers and in which a subset of the programming on the "customized" channels available to each customer is selected using an agreement matrix for presentation to the customer as "virtual channels" tailored to that customer's characteristic profiles. However, one of the more interesting applications of the above-mentioned customer profile system is that the same customer profiling system may be used to provide feedback from individual customers regarding what characteristics they find most desirable in the broadcast shows. By obtaining this information, the customer profiles may be appropriately updated as described above. As will now be described, the video programming schedules also may be updated to reflect the customers' actual preferences, and information may be combined with the customer demographics and customer profiles to provide targeted advertising and targeted shop at home opportunities for the customer.

A key feature of many video/cable television installations is that it is possible to obtain active feedback from the customer: either simply what was watched at each time or, more completely, how much the customers (in their estimation) liked what they saw. Monitoring viewing patterns is referred to herein as "passive" feedback, since unlike such prior art "active" feedback systems where the customers actually rate how much they like particular programs (see, e.g., Strubbe, U.S. Pat. No. 5,223,924), passive monitoring in accordance with the invention does not require any customer actions. As will be described below, passive feedback can be used to improve characterizations of customers' preferences for programs, which, in turn, leads to better selection and scheduling of programs. Also, as just noted, passive feedback provides new target marketing opportunities.

Profiles of customers indicating which video program characteristics they prefer can be combined with content profiles of video programs indicating which characteristics they possess to give a measure of how well each customer should like each video program. One way of doing this is to construct an agreement matrix as described above. Passive feedback is used in conjunction with the agreement matrices to improve customer profiles and content profiles and hence to improve program schedules.

Passive feedback can be used both to improve individual customer profiles and to improve customer profiles for clusters of customers. Customer profiles of customer clusters then can be used to improve the profiles of all customers constituting the cluster. As a simple example, if one finds that most people in a cluster like movies by a particular director, then one could conclude that the other customers in the cluster would probably like that director as well.

As with methods for updating individual customer profiles, one can characterize clustering methods for grouping together customers (e.g. for a "video club") as lacking feedback, using passive feedback, or using active feedback. As described above, the basic agreement matrix method of the present invention, in which video programs are characterized by certain identifying characteristics which are then compared to the customers' preferences for those characteristics, uses no measurement of what is watched or other feedback. However, as also noted above, that method can be supplemented with customer ratings of movies (active feedback) or passive feedback of who watched what movies when so that the customer profiles and/or content profiles may be adjusted. It is now proposed that those monitoring techniques be augmented by a clustering algorithm which combines passive feedback with the use of customer profiles and content profiles. This offers the advantage of using the technique of the invention even when no initial customer profiles are available and there is no past history of what the customers have watched.

The technique starts, optionally, with a profile of the customer in terms of what movie characteristics he or she finds important. It then refines the importance given to different characteristics based on how accurately the characteristics predict what movies the customer actually watched.

A. Algorithm for Passive Updating of Customer Profiles

The same notation as used above will be used here to describe the methods for using passive feedback to improve profiles of customers, movies, and customer clusters. Namely: $cv_{ik}$ is the amount of characteristic k that customer i desires, $wv_{ik}$ is the importance of characteristic k to customer i, and $cp_{jk}$ is the degree to which movie j has characteristic k. For notational simplicity, it is assumed below that the weightings are normalized ($\Sigma_i wv_{ik}=1$) so that the customer weightings add to one. There are: J movies, K characteristics, I customers, M "experts", and P movies to be selected for a given viewing interval (e.g., a day or week). The agreement matrix incorporates both the desired amount of each characteristic and its importance to the customer using Equation (21) set forth above, except that $w_{ik}$ has been normalized.

Given a set of J movies available with characteristics $cp_{jk}$, and a set of customer preferences, $cv_{ik}$, customer i would be predicted to pick a set of P movies to maximize:

$$\sum_{\substack{j \text{ in the} \\ \text{best } P \text{ of } J}} ac_{ij}$$

If the customer picks a different set of P movies than was predicted, cv and $w_{ik}$ should be adjusted to more accurately predict the movies he or she watched. In particular, cv and $w_{ik}$ should be shifted to reduce the match on movies that were predicted to be watched but were not watched, and to increase the match on movies that were predicted not to be watched but were watched. There are several ways to do this. One is to shift cv for each wrong prediction for customer i and movie j using:

$$cv_{ik}=cv_{ik}-\Delta(cv_{ik}-cp_{jk}). \quad \text{Equation (24)}$$

This will increase the match by making cv closer to cp if $\Delta$ is positive—and is representative of the case where the algorithm failed to predict a movie that the customer watched. The size of $\Delta$ determines how many example movies one must see to replace what was originally believed. If $\Delta$ is too large, the algorithm will be unstable, but for sufficiently small $\Delta$, cv will be driven to its correct value. One could in theory also make use of the fact that the above algorithm will decrease the match if $\Delta$ is negative, as for the case where the algorithm predicted a movie that the customer did not watch. However, there is no guarantee that cv will be moved in the correct direction in that case.

One can also shift $w_{ik}$ using a similar algorithm:

$$w_{ik} = \frac{(w_{ik} - \Delta|cv_{ik} - cp_{jk}|)}{\sum_k (w_{ik} - \Delta|cv_{ik} - cp_{jk}|)} \quad \text{Equation (25)}$$

As before, this will increase the match if $\Delta$ is positive, as for the case where the algorithm failed to predict a movie that the customer watched, this time by decreasing the weights on those characteristics for which the customer profile differs from that of the movie. Again, the size of $\Delta$ determines how many example movies one must see to replace what was originally believed. Unlike the case for cv, one also makes use of the fact that the above algorithm will decrease the match if $\Delta$ is negative, as for the case where the algorithm predicted a movie that the customer did not watch. The denominator of Equation (25) assures that the modified weights $w_{ik}$ still sum to one.

Both cv and $w_{ik}$ can be adjusted for each movie watched. When $\Delta$ is small, as it should be, there is no conflict between the two parts of the algorithm.

There are several ways to initialize the algorithm, depending on what information is available, including:

(a) questioning the customer as to what characteristics they find important in movies or other programming;

(b) using a customer profile typical of the other customers with the same demographic profile as the customer;

(c) using a typical customer profile (assuming no demographics are available); and (d) random selection, which is not desirable unless a solid history of movies is available.

The example set forth in Section III above will now be extended to illustrate the above-described feedback process for improving the characterizations of the customer preferences for the programs.

As noted in the example in Section III above, the customers' profiles (cv', sv', wv') are initially estimated. The estimated initial normalized weight (w') and the agreement scalars with all the programs are then calculated accordingly. During the customer feedback process, each time a customer picks a program which differs from the program that is predicted based on the current estimated agreement scalars, corrections are made to the estimated characteristic and weight profiles, which assumably will move the estimated profiles closer to the true profiles.

If it is assumed that at time period n customer i watches a movie j but the algorithm predicts program h, corrections will be made to customer i's characteristic profile as follows:

$$cv'_{ik}{}^{n+1}=cv'_{ik}{}^{n}-\Delta(cv'_{ik}{}^{n}-cp'_{jk}), \text{ for all k,}$$

and to the weight profile as follows:

$$w'^{n+1}_{ik} = \frac{w'^n_{ik} - \Delta(cv'^n_{ik} - cp'_{jk} + cp'_{hk})}{\sum_l w'^n_{il} - \Delta(cv'^n_{il} - cp'_{jl} + cp'_{hl})},$$

for all k,
where the positive parameter $\Delta$ determines the size of the correction step.

For instance, an initial estimated customer profile ($cv'^0$) could be found using a random function to be:

| customer | romance | high-tech | violence |
|---|---|---|---|
| 1 John | 1.595 | 9.894 | 9.174 |
| 2 Mary | 6.735 | 3.897 | 0.000 |

If it is then supposed that there are three television channels and programs 1, 2, and 6 available for broadcast, John (customer 1) chooses program 1 since it has the highest agreement scalar with him, based on his true customer profiles, among the three available programs. However, according to his current estimated customer profile, program 6 was predicted. Hence, a correction is necessary. For simplicity, changes are made only in his current estimated characteristic customer profile $cv'^0_1$ to create his new estimated profile $cv'^1_1$. In other words, his weight profile will not be adjusted. Thus, if $\Delta=0.1$, the customer profiles are adjusted to:

$$cv'^1_{11} = 1.595 - 0.1*(1.595-2) = 1.635$$

$$cv'^1_{12} = 9.894 - 0.1*(9.894-9) = 9.805$$

$$cv'^1_{13} = 9.174 - 0.1*(9.174-4) = 8.856$$

As a result, the new estimated customer profile $cv'^1_1$ is closer to the true customer profile than the previous estimated profile $cv'^0_1$.

The following represents a typical feedback process (without weight correction):

| | Initial Estimated Profiles | | |
|---|---|---|---|
| 1 John | 3.399 | 10.000 | 5.448 |
| 2 Mary | 10.000 | 2.190 | 1.216 |
| | Run 1 (92% correct predictions): Estimated Profiles | | |
| 1 John | 1.943 | 9.760 | 5.941 |
| 2 Mary | 10.000 | 2.190 | 1.216 |
| | Run 2 (97% correct predictions): Estimated Profiles | | |
| 1 John | 1.597 | 9.735 | 6.139 |
| 2 Mary | 10.000 | 2.190 | 1.216 |
| | Run 3 (100% correct predictions): Estimated Profiles | | |
| 1 John | 1.597 | 9.735 | 6.139 |
| 2 Mary | 10.000 | 2.190 | 1.216 |

Thus, the estimated profiles in Run 3 are the same as for Run 2, where each run contains 100 loops (time periods). After 3 runs, the estimated profiles are good enough to make constant correct predictions.

By way of summary, the following steps should be provided for passive feedback of customer preferences:

1) Pick starting values for $cv_{ik}$, $cp_{jk}$, and $w_{ik}$. As noted above, these values may be determined from questionnaires or, for new customers, the values can be set to those of a typical customer, optionally based on demographics.

2) Each time that a customer i watches a movie j that the algorithm did not predict they would watch, update $cv_{ik}$, $cp_{jk}$ and $w_{ik}$ using:

$$cv_{ik}=cv_{ik}-\Delta(cv_{ik}-cp_{jk}),$$

$$cp_{jk}=cp_{jk}-\Delta(cv_{ik}-cp_j), \text{ and/or}$$

$$w_{ik}=(w_{ik}-\Delta|cv_{ik}-cp_{jk}|)/\Sigma_k(w_{ik}-\Delta|cv_{ik}-cp_{jk}|).$$

Each time the customer i does not watch a movie j that the algorithm predicts they would watch (but only if the customer is watching something), update $w_{ik}$ using:

$$w_{ik}=(w_{ik}+\Delta|cv_{ik}-cp_{jk}|)/\Sigma_k(w_{ik}-\Delta|cv_{ik}|-cp_{jk}|).$$

In all of the above equations, $\Delta$ is a small positive number, set to roughly one over the number of movies that one wishes to observe to half forget the original values of $cv_{ik}$, $cp_{jk}$, and $w_{ik}$.

B. Variations to Passive Characterization Algorithm

Many variations to the passive characterization algorithm are possible. For example, the characterization of the movies was assumed to be correct in the above feedback system. As a result, the customer profiles were adjusted. However, if one believed the customer profiles and not the movie characterization, one could use a similar algorithm to adjust the movie characterizations. In practice, one would use both methods simultaneously: if predictions for one person are less accurate than average, that person's profile should be adjusted, but if predictions for one movie are less accurate than average for movies, that movie's characterization should be adjusted.

The simplest algorithm is to shift cp for each wrong prediction for customer i and movie j using:

$$cp_{jk}=cp_{jk}-\Delta(cv_{ik}-cp_{jk}) \quad\quad \text{Equation (26)}$$

This will increase the match by making cp closer to cv if $\Delta$ is positive. As before, this should only be done for the case where the algorithm failed to predict a movie that the customer watched.

Another possibility would be to not use any characterization of the movies or customers, but simply to group the customers together based on the number of movies that they viewed in common. This requires overcoming some minor technical difficulties in controlling for different numbers of movies being watched by customers. On the other hand, if active feedback on how well the customers liked the movies is available, one could also use this information. Rather than making changes simply based on "watch/did not watch", one can weigh the changes (i.e., alter the size of the $\Delta$'s) based on the degree of customer like/dislike of the program. In addition, one can also modify the algorithm to take into account other known determinants of customer behavior. For example, customers tend to continue watching programs which are shown on the channel that they are currently watching. This means that even if the agreement matrix correctly predicts that a customer would prefer a program on a different channel, the customer may not discover the other program (or bother to change to it). In this case, the agreement matrix was not incorrect and so the customer and content profiles should not be altered. This can easily be incorporated into the passive feedback algorithm by using smaller changes (smaller Δ's) when a customer remains tuned to the same channel (possibly virtual channel) than when they simply switch channels.

C. Customer Clustering

As noted above, customer profiles can be kept for groups of customers as well as for individual customers. Grouping customers together into customer clusters offers several advantages. Most importantly, if the clusters are accurate, improvement of customer profiles will be much faster, since far more movies are viewed per week by a cluster than by any individual in the cluster. Clustering also provides a means of setting up an initial profile for new individuals joining a video service in accordance with the invention, as they can, as a starting point, be given a profile based on demographic data or on surveys they fill out.

There is a long tradition of clustering people based on demographic or other data, and many clustering algorithms exist ranging from traditional methods such as factor analysis or the k-means clustering algorithm to more esoteric neural network-based methods such as Kohenen networks. Any of these can be used for the task described here, but the present inventors prefer the k-median clustering algorithm. Clusters can be formed based on (1) what programs people watch, (2) what features of programs customers rate as important (e.g., how similar their agreement matrices are), or (3) a combination of programs and features. One can also include demographic or psychographic customer profiles or other information.

The clustering mechanism selected must address several technical issues. Most importantly, the clustering algorithm must take into account the fact that different attributes used for clustering may have different degrees of importance, and may be correlated. If one uses as a clustering criterion a pure measure, such as maximizing the number of programs watched in common, or maximizing the degree of similarity of the customers' agreement matrices, this is not a problem, but if these attributes are combined with other information such as demographics, the algorithm must determine an appropriate metric, i.e., combination weights for the different measures.

Once clusters have been determined, they can be used in several ways. As the profiles for the clusters are updated based on what the customers in the cluster watched, the profiles for the individuals in the cluster can be similarly updated. Thus, customer profiles can be updated both based on what they watch and on what customers with similar tastes watch. These modified customer profiles would be used for determining virtual channels and for scheduling which movies to broadcast.

As noted above, the purpose of clustering is to group objects with high similarity into clusters. In a multi-channel cable television system, individual channels are often devoted to their specific "audience", or to a group of customers who enjoy relatively homogeneous preference profiles. Prior to the design of the features of the channels, it is thus necessary to recognize these customer groups as well as their collective profiles.

There are three basic approaches towards clustering in accordance with the invention: hierarchical methods, clumping techniques and optimization techniques. Hierarchical methods fall further into two types—divisive or agglomerative. In clumping techniques, some objects may belong to several groups simultaneously. Optimization techniques, such as the k-means algorithm and the algorithm for the p-median problem, takes the form of linear programming in an iterative approach.

The two algorithms presently preferred for cable television applications are: a hierarchical method based on the theory of fuzzy set, with which the compactness of the population is estimated, and a revised p-median method, which does the real clustering. A membership equation may also be borrowed from the fuzzy logic based k-means algorithm to find correspondence of various categories of video programs to the customer clusters.

The process of clustering customers in accordance with the invention is composed of three phases:

1) Estimating the distribution of the customer population;
2) Clustering the customer population; and
3) Determining the correspondence of the video program categories to the customer clusters.

Estimating the distribution of the customer population is necessary because the value of an adjustment parameter used to cluster the customer population depends on the compactness of the population. Knowing the distribution of the customer population also helps one to make general judgments on the validity of the number of clusters obtained in the last phase.

The fuzzy logic based hierarchical method mentioned above is preferably used for the estimation of population compactness since the theory of fuzzy set is suitable for dealing with uncertainty and complex phenomena that resist analysis by classical methods based on either bivalent logic or probability theory. As known by those skilled in the art, hierarchical clustering methods generate a hierarchy of partitions by means of a successive merging (agglomerative) or splitting (diversion) of clusters. This type of clustering method corresponds to the determination of similarity trees where the number of groups $q(\alpha)$ increases monotonously as the value of $\alpha$ increases, where $\alpha$ represents the degree of "belonging" of an element in a group. A group is broken up when the value of $\alpha$ goes beyond the minimum membership value within that group. Therefore, loosely formed groups, typically found in a scattered population, break up at low levels of $\alpha$, while highly dense groups, often seen in a compact population, dismantle only at high levels of $\alpha$. Consequently, in a graph with $\alpha$ on the x axis and q on the y axis, the former yields a concave curve and the latter gives a convex curve.

The compactness of a population may be established using the following equation, where C is a measure of compactness:

$$C = \int_0^1 \frac{\alpha q(\alpha) d\alpha}{q(1)} \qquad \text{Equation (27)}$$

This equation, of course, is difficult to calculate. It is thus preferable to use its discrete version:

$$C = \beta * \frac{\sum_{\alpha=\alpha_0}^{\alpha_n} h_\alpha q(\alpha)}{q(\alpha_n)} \qquad \text{Equation (28)}$$

where $h_\alpha = \alpha_i - \alpha_{i-1}$, the interval of $\alpha$. A typical setting is $\alpha_0 = 0.1$, $\alpha_n = 1.0$, and $h_\alpha = 0.1$.

For the membership function of the similarity relation, $\mu_R(i,j)$, which indicates the similarity between customers i and j, and an agreement scalar, $ac_{ij}$, similar to the one defined above can be used. This time $ac_{ij}$ is defined as:

$$ac_{ij} = 1 \bigg/ \left[1 + (1/K)\sum_k (wv_{ik}/W_i)t_{ijk}\right] \qquad \text{Equation (29)}$$

$$(i = 1, 2, \ldots N; j = 1, 2, \ldots N)$$

where:

$$t_{ijk} = |(c_{ik} - c_{jk})|/s_{cik-cjk} \qquad \text{Equation (30)}$$
$$= \infty$$
$$\text{if } c_{ik} >= 0$$
$$\text{if } c_{ik} = -1$$
$$(i = 1, 2, \ldots, N; j = 1, 2, \ldots, N; k = 1, 2, \ldots, K)$$

and:

$$S_{cik-cjk} = \sqrt{(s_{ik}^2 + s_{jk}^2)/(N-1)} \qquad \text{Equation (31)}$$

where:
- $ac_{ij}$ is the agreement scalar between the profiles of customer i and the profiles of customer j;
- $t_{ijk}$ is the t value for significance of the difference between the rating of characteristic k by customer i and by customer j;
- $c_{ik}$ is customer i's rating for characteristic k;
- $s_{jk}$ is the spread (flexibility) in customer i's rating for characteristic k;
- $s_{Cik-Cjk}$ is the standard deviation between the distribution of $c_{ik}$ and that of $c_{jk}$;
- $wv_{ik}$ is customer i's weight of characteristic k;
- $W_i$ is $\Sigma_k wv_{ik}$, i.e., the sum of all weights for customer i; and
- N is the sample size.

One is added to the denominator in Equation (29), so that $0 < ac \leq 1$, which is the range required for a valid membership value.

The actual clustering is done by a revised p-median algorithm. Traditional p-median clustering algorithms require the prior knowledge of p, the number of clusters, a requirement often difficult to meet in reality, especially in an application of the type described here. Accordingly, a modified p-median clustering algorithm is preferably used which introduces p into the objective function, thereby eliminating the iterative nature of the algorithm and overcoming the difficulty of guessing an initial p value.

In the population clustering method in accordance with the invention, the grouping of objects moves in the direction of minimizing dissimilarity between the objects, where dissimilarity between objects is indicated by some measure of "distance" between them. In other words, for a population V that contains N customers, any customer can be described in the system by a vector of K characteristics.

Thus, for any two customers i and j:

$$V_i = [c_{i1}, c_{i2}, \ldots, c_{ik}, \ldots, c_{iK}]$$
$$V_j = [c_{j1}, c_{j2}, \ldots, c_{jk}, \ldots, c_{jK}]$$

which in fact are the preference profiles of the two customers, which are determined as set forth in detail above. In general, the distance between the two customers i and j is defined as:

$$d_{ij} = \Sigma_{k=1}^{K} f_k(c_{ik}, c_{jk}) \qquad \text{Equation (32)}$$

where $f_k(c_{ik}, c_{jk})$ is the individual measure of distance for each characteristic. The distance may be determined in several ways such as absolute "City Block" distance, Hamming distance, Euclidean distance, etc. A major drawback of using these measures in the present invention, however, is that they fail to recognize the spread (flexibility) in a customer's rating for the characteristics. In order to take the flexibility into consideration, it is necessary to define:

$$d_{ij} = \left[\sum_k (w_{ik}/W_i)t_{ijk}\right]\bigg/ K \qquad \text{Equation (33)}$$

$$(i = 1, 2, \ldots N, j = 1, 2, \ldots N),$$

where $w_{ik}$, $W_i$, and $t_{ijk}$ are defined as above. Distance $d_{ij}$ is somewhat like the reciprocal of the agreement scalar $sc_{ij}$.

In order to incorporate p, the number of clusters, into the objective function so as to optimize p, its coefficient should reflect the nature of the entire population. The global mean used in the formulation of the problem is thus:

$$\frac{\sqrt{\sum_i \sum_j d_{ij}^2}}{n^2} \qquad \text{Equation (34)}$$

where $d_{ij} \geq 0$, for i,j, i≠j; and $d_{ij}=0$, for i,j, i=j. The objective function is the minimization of the total sum of the distance between the customers for the case where each customer is assigned to exactly one cluster.

As noted above, $\alpha$ ($0.5 \leq \alpha \leq 1.5$) is an adjustment parameter. For normal populations, its value is 1. For abnormally distributed populations, however, its value may change. For instance, in a highly scattered population, the value of a may increase so as to create highly distinguished clusters. Therefore, a is a negative function of C, the compactness measure defined in Equations (27) and (28) above. A possible form of the function could be $\alpha = \beta/C$, where $\beta$ is a parameter whose value is determined through calibration.

The designing of a "virtual" video channel, which is oriented towards one or more customer groups, should be performed so that the combined features of the program categories it carries match the preferences of its target customers. It is therefore important to know the correspondence of various video categories to the customer clusters obtained after running the clustering algorithm set forth above. One way to determine the correspondence between a program category and a customer cluster is to calculate the "membership" of the category in the cluster. The "membership" function for Category l in cluster i is defined as:

$$\mu_{il} = \frac{\left(\frac{1}{d_{il}}\right)^M}{\sum_j \left(\frac{1}{d_{jl}}\right)^M} \qquad \text{Equation (35)}$$

where $d_{il}$ is defined as in Equation (33). M is a weighting parameter (M>1), which reduces the influence of small $\mu_{il}$ compared to that of large $\mu_{il}$'s (customer clusters close to the category). The more M is greater than one, the more the reduction.

D. Creating Initial Profiles From Clusters

As noted in Section II.B. above, there are several methods for determining initial customer and content profiles. For example, initial customer profiles may be established by having the customer select a few of his or her favorite movies or television shows and then using the content profiles of those movies or shows to construct a customer profile. In addition, the initial customer profile may be based on replies to questions asked of the customer, or conversely, the customer may be assigned a customer profile typical of people in his or her demographic group. Similarly, initial content profiles may be established by using ratings by experts or test groups indicating the degree of presence of different characteristics or by using the relative frequencies of words in movie reviews or closed captioned listings and the like. However, it is often useful to use data indicating which programs each viewer has watched in order to determine the initial profiles for either new customers or new programming.

Intuitively, the customer profiles of new customers should look like the content profiles of the movies and/or shows they watch, and the content profiles of new movies should look like the customer profiles of the customers who watch those movies. If each customer has a single customer profile, the method for determining the customer profile is simple: one simply finds the centroid of the content profiles of all the movies and/or shows watched by the customer. However, since each customer may have multiple customer profiles, only one of which is expected to match each movie or show, the movies watched by a customer must be clustered into groups for selection of the centroid (average) of each group. Similarly, if one has a list of people who have watched a movie or show, one can determine a content profile for that movie or show by clustering the profiles of the customers and selecting the profile cluster containing the most customers.

By using clustering techniques, one can also determine an initial customer profile even if no history of the customer's preferences is available. In particular, by clustering customers based on demographic or psychographic data, new customers may be assigned customer profiles typical of customers with similar demographics or psychographics. On the other hand, when no characteristics are known for movies or customers, an agreement matrix indicating which movies each customer is likely to watch may be computed from a record of which movies each customer has already watched. As described above, this agreement matrix can be used for selecting a set of virtual channels for each customer, for scheduling movies for delivery over a cable or equivalent transmission system, and for making movie rental or other rental or purchase recommendations at a kiosk or personal computer (described below). The key to generating the agreement matrix using this approach is the observation that if two people have liked many of the same movies or shows in the past, then they are likely to continue to like similar movies or shows. More precisely, if a person "A" has seen and liked many movies or shows which a second person "B" has seen and liked, then "A" is likely to like other movies or shows which "B" liked. The method set forth below generalizes this concept to multiple customers.

In the simplest use of clustering, a record is kept of all movies or shows watched by all customers. If the customers are not identified, they are identified by whether or not their television is on. The customers are then grouped so that people who have watched more movies or shows in common are more likely to be in the same group. In other words, the customers are divided into groups to minimize the sum over all the groups of the sum over all pairs of group members of the distance between the members. Practically, this means that the distance from the centroid of the group is computed since it is cheaper to compute. Since the inverse of the distance is a measure of agreement, the clusters are preferably selected to maximize agreement among the cluster members.

Once the customers have been clustered into groups, the effective popularity of movies or shows for the cluster can be determined by counting the total number of times each movie or show was watched. An agreement matrix between the customers and movies or shows may be constructed based on these clusters by assigning each customer the agreements ("effective popularity") of the movies or shows for the cluster that the customer is in, where all members of a group have the same agreement.

In particular, a technique for creating initial profiles from cluster data includes the steps of:

(1) picking the number of desired groups, K;
(2) using the k-means algorithm to group the customers into K groups to minimize the sum over all the groups of the sum over all pairs of group members of the distance between each group member and the group centroid. In other words, it is desired to minimize:

$$\sum_{\substack{\text{clusters} \\ k=1 \text{ to } K}} \sum_{\substack{\text{customers} \\ i \text{ in } K}} |v_i - v_k| \qquad \text{Equation (36)}$$

where $|v_i - v_k|$ is the distance between the vector of movies watched by customer i and the centroid of cluster k. $v_i$ is one for each movie watched by customer i and zero for each movie not watched. The simplest measure is the Euclidean distance:

$$|v_i - v_k| = \text{sqrt}\left(\sum_m (v_{im} - v_{km})^2\right) \qquad \text{Equation (37)}$$

where $v_{im}$ is the value corresponding to the mth movie watched (or not watched) by customer i; and (3) determining the agreement matrix elements $ac_{ij}$. For each customer i, the jth row of the agreement matrix is just the vector $v_k$ for the cluster k that the viewer i is in.

As an example of this technique, assume the following viewing history, where each "x" indicates that a video program (A–G) was watched by a customer (1–6):

|  | \program | | | | | | |
|---|---|---|---|---|---|---|---|
| customer\ | A | B | C | D | E | F | G |
| 1 | x | x | x | x | x |  |  |
| 2 |  | x | x | x |  |  |  |
| 3 | x |  | x | x |  |  |  |
| 4 |  |  | x | x | x | x |  |
| 5 |  |  |  | x |  | x | x |
| 6 |  |  |  | x | x | x | x |

Clustering using a standard algorithm such as k-means clustering will divide the above people into two groups: {1,2,3} and {4,5,6}. The centroid of each cluster is found by calculating the average number of viewers of each movie in the cluster. The centroid of the {1,2,3} group is {2/3,2/3,1, 1,1/3,0,0}, corresponding to movies A, B, C, D, E, F, and G, respectively. The centroid of the {4,5,6} group is {0,0,1/3, 1,2/3,1,2/3}. The resulting agreement matrix is thus:

| customer\ | \program A | B | C | D | E | F | G |
|---|---|---|---|---|---|---|---|
| 1 | ⅔ | ⅔ | 1 | 1 | ⅓ | 0 | 0 |
| 2 | ⅔ | ⅔ | 1 | 1 | ⅓ | 0 | 0 |
| 3 | ⅔ | ⅔ | 1 | 1 | ⅓ | 0 | 0 |
| 4 | 0 | 0 | ⅓ | 1 | ⅔ | 1 | ⅔ |
| 5 | 0 | 0 | ⅓ | 1 | ⅔ | 1 | ⅔ |
| 6 | 0 | 0 | ⅓ | 1 | ⅔ | 1 | ⅔ |

In a broadcast/cable application of the type described herein, it may be desirable to construct different agreement matrices of this type for different times of day or days of the week.

This technique can be refined in two ways: (1) by using fuzzy clustering techniques, where a customer may belong to different clusters, and (2) by requesting a rating from each customer for each movie viewed. In the case of fuzzy clustering, each customer gets an agreement matrix which is the sum of the agreement matrices for the groups he or she belongs to weighted by the degree to which the viewer belongs to the group. In the case of rating requests, on the other hand, the clusters are made not just based on whether the movies were watched, but also based on how much they were liked as determined from the viewers' ratings of the movie (for example, on a scale of 1 to 10). In the latter case, a different distance metric should be used so that an unrated movie is not confused with a movie that was viewed and not liked. An appropriate metric is to use the Euclidean distance but to exclude all programs not reviewed by the customer. A preferred embodiment for kiosks or personal computers (described below) incorporates both of these refinements.

One skilled in the art will recognize that many additional variations on this technique are possible within the scope of the invention. For example, instead of a standard Euclidean distance metric, one may wish to use the inverse of the fraction of movies which were watched by both members of the pair. As another alternative, agreements can be normalized by the number of movies or shows the customer has seen. Also, customers who do not want to watch movies repeatedly may block the viewing of recently viewed movies to avoid repeat viewing.

VI. Hardware Implementation of Profile System

Two hardware embodiments of the invention may be used to implement the system described above. In a so-called one-way data transmission system, no feedback from the set top multimedia terminal is provided for adjusting the customer profiles or the content profiles. In a two-way data transmission system, on the other hand, passive feedback techniques are used to better personalize the video offerings over time. Both hardware embodiments will be described below.

A. One-Way Data Transmission System

In a one-way data transmission system in accordance with the invention, a customer profile system in accordance with the invention calculates the agreement matrix at the customer's set top multimedia terminal from the customer profiles stored in the set top multimedia terminal and the content profiles of the received video programming. This technique allows the set top multimedia terminal to create "virtual channels" of the video programming received which the set top multimedia terminal deems most desirable on the basis of the customer's profile(s).

Figure 4:
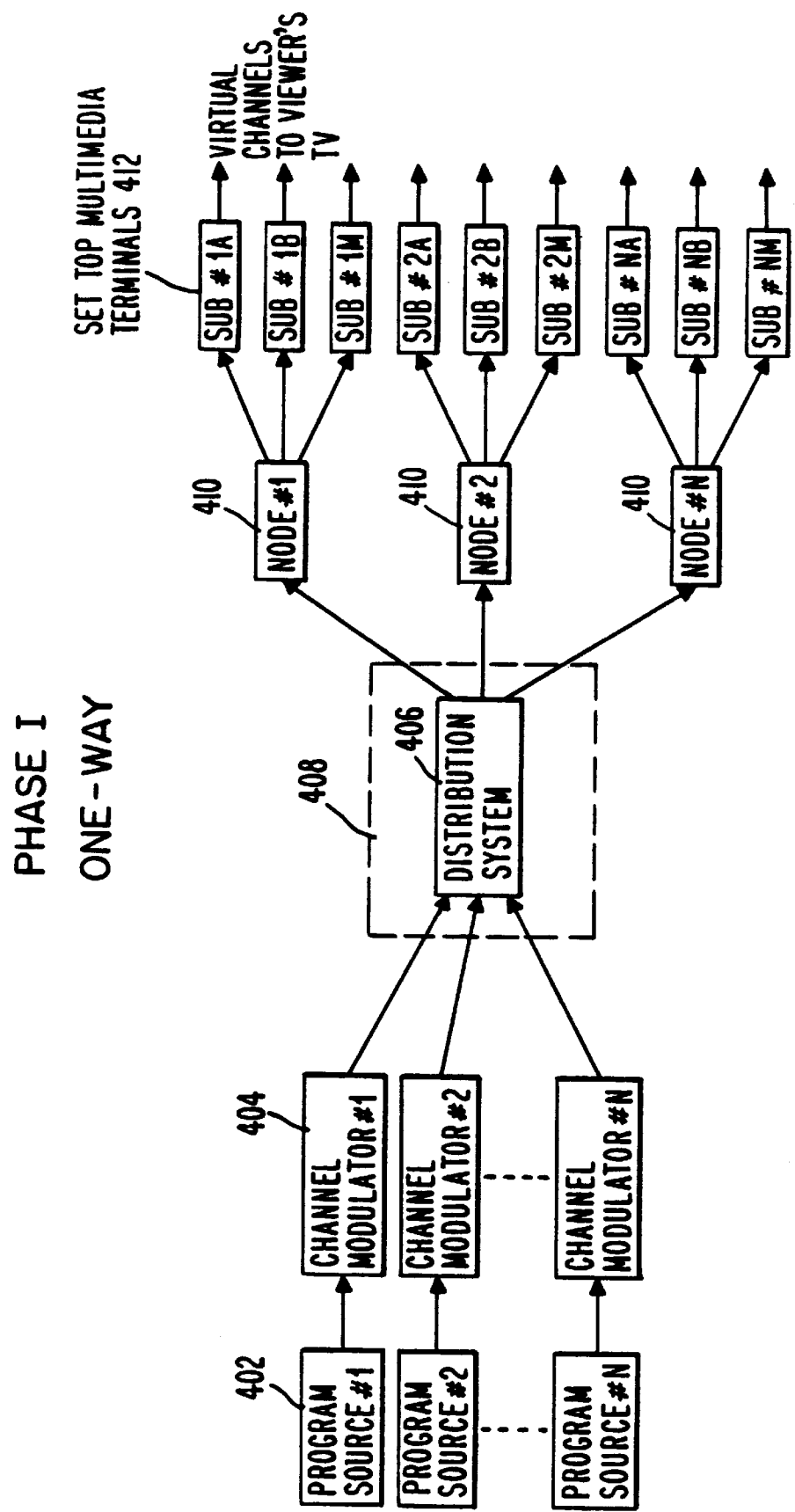
FIG. 4 is a generalized system overview of a one-way customer profile system in accordance with the invention in which customized virtual channels are created at the set top multimedia terminals from the channels received from the CATV head end.

The first embodiment thus does not use any of the feedback and updating techniques described above. FIG. 4 illustrates a generalized diagram of such a one-way video distribution system in accordance with the first hardware implementation of the invention. As illustrated in FIG. 4, a plurality of program source materials 402 are modulated by a plurality of channel modulators 404 and distributed via distribution system 406 at head end 408 and via respective nodes 410 to set top multimedia terminals 412 in the homes of the head end's customers. In this embodiment of the invention, the set top multimedia terminals 412 and/or the distribution system 406 include software such as that described above for determining an agreement matrix for each customer. The agreement matrix suggests programming for "virtual channels" and/or controls the tuners of the set top multimedia terminals 412 to select the most desired programming for the customers in accordance with the customer's profiles. In other words, a plurality of "virtual" channels are created from the agreement matrix, and the selected programming is provided from each set top multimedia terminal 412 to the associated television. The customer then decides whether he or she wants to watch one of the "virtual" channels or one of the conventional channels.

In the embodiment illustrated in FIG. 4, the set top multimedia terminals 412 sit on top of the television and receive as input the shows being broadcast and their associated content profiles (either in the bit stream, the vertical blanking interval, or separately as part of the electronic program guide information). The set top multimedia terminals 412 have the customer profiles for that residence prestored therein. Set top multimedia terminal 412 may also include means for monitoring which shows are being watched by the customer. From this information, the customer profiles stored in the set top multimedia terminal 412 may be modified by the software of the set top multimedia terminal 412 using the techniques described in Section II.B. above. In other words, each set top multimedia terminal 412 preferably includes means for updating the customer profiles based on what the customer actually watched. However, the set top multimedia terminals 412 do not provide the list of the watched programs back to the head end for adjusting the video programming schedule since a two-way data transmission system would be required.

B. Two-Way Implementation

The second embodiment of the invention incorporates the above-mentioned passive feedback techniques to provide information from the set top multimedia terminals back to the head end so that the video programming schedule may be adjusted and so that targeted advertising and the like may be provided from the head end. This embodiment differs from the first embodiment in that data regarding the customer's selections of programming is collected by the head end for use in future program scheduling. Data collection in accordance with the invention is the process by which the customer viewing results and/or profiles are collected by the CATV and/or conventional broadcast system for subsequent processing and assimilation. In the two-way implementation, the customer profile system is implemented at the video head end by creating an agreement matrix for all customers from customer profiles stored at the head end and content profiles of the video programming to be transmitted. This technique allows the video head end operator to objectively determine which video programming is most likely to be desired by his or her customers and also allows one to minimize the memory requirements at the set top multimedia terminal.

Memory requirements at the set top terminal are minimized by limiting, at the head end, the amount of data which is transmitted to the set top terminal for storage in accordance with the profiles of the user. In other words, data which does not match the profile of a particular customer is not transmitted and stored at the set top terminal. For example, electronic program guide (EPG) data which is normally transmitted to the user for all channels is limited at the head end to only that EPG data which matches the profile of the particular customer. In one example, the portion of the EPG listing those programs which are not likely to be of interest to the customer are not downloaded at all. In another example, the titles for all EPG programs are transmitted, but the program descriptions are downloaded only for those programs likely to be of interest to the customer. Thus, the agreement matrix acts as a filter for filtering the data which is downloaded to the set top terminal for storage. In this manner, the hardware demands for memory at the set top terminal are minimized, without sacrificing any material of interest to the customer.

Two main hardware implementations for data collection are described herein with reference to the preferred two-way embodiment: telephone system return and CATV system return. Both of these approaches utilize a "wired" return path for data collection. In addition, those skilled in the art will appreciate that several wireless alternatives for data collection are possible. The specific implementation selected depends upon several variables, including the technology in place on the CATV or conventional over air broadcast system, specific polling techniques employed, telephone system flexibility, the required/desired frequency for polling the data, and the level of maintenance employed on the CATV or conventional over air broadcast system. Details of a telephone system implementation are highlighted in FIGS. 5 and 6.

Figure 5:
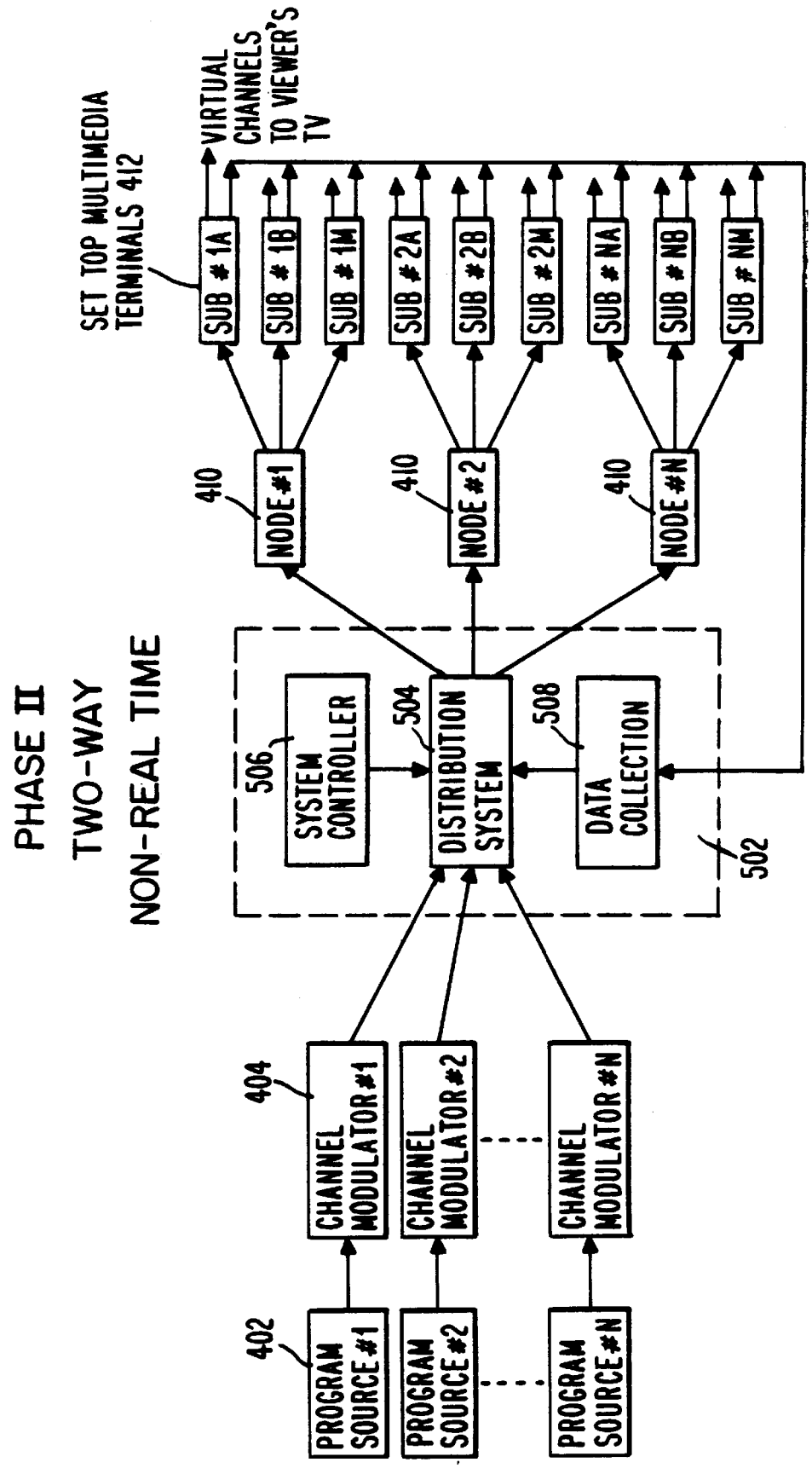
FIG. 5 is a generalized system overview of a two-way customer profile system which expands upon the embodiment of FIG. 4 by feeding back data representative of the customers' viewing habits from the customers' set top multimedia terminals to the CATV head end for purposes of optimally scheduling the channels for transmission from the head end in accordance with the recorded customer preferences.

FIG. 5 illustrates a generalized diagram of a two-way video distribution system in accordance with the invention. In this embodiment, the customer profile information and viewing habit information from the individual set top multimedia terminals is relayed to the head end 502 on a periodic basis for updating the agreement matrices on a system level to determine what video programs should be transmitted in particular time slots. As in the one-way embodiment of FIG. 4, program source material 402 is modulated onto respective channels by modulators 404 for distribution to the customers. However, in the two-way embodiment of FIG. 5, the head end 502 includes a distribution system 504 which is controlled by system controller 506 to schedule the presentation of the program source material 402 to the customers in response to passive feedback data stored in data collection memory 508 which has been received from the customers' set top multimedia terminals 412. In particular, the customer profile data and viewing habit data is collected and periodically provided via return path 510 to data collection memory 508 as a record of what the customers desire to watch and what they actually watched.

In accordance with the techniques described in detail above, this information is then used to appropriately update the system profiles (composite of all customer profiles) and/or the content profiles of video programs and thus, in turn, is used in adjusting the scheduling of the program source material 402 for transmission via nodes 510 to the respective set top multimedia terminals 512 in the customers' homes. As in the one-way embodiment of FIG. 4, each set top multimedia terminal 412 then determines "virtual" channels for presentation to the customers' televisions. As noted above, return path 510 preferably constitutes a telephone connection, although the return path 510 could also be a portion of the broad band cable connection.

Figure 6:
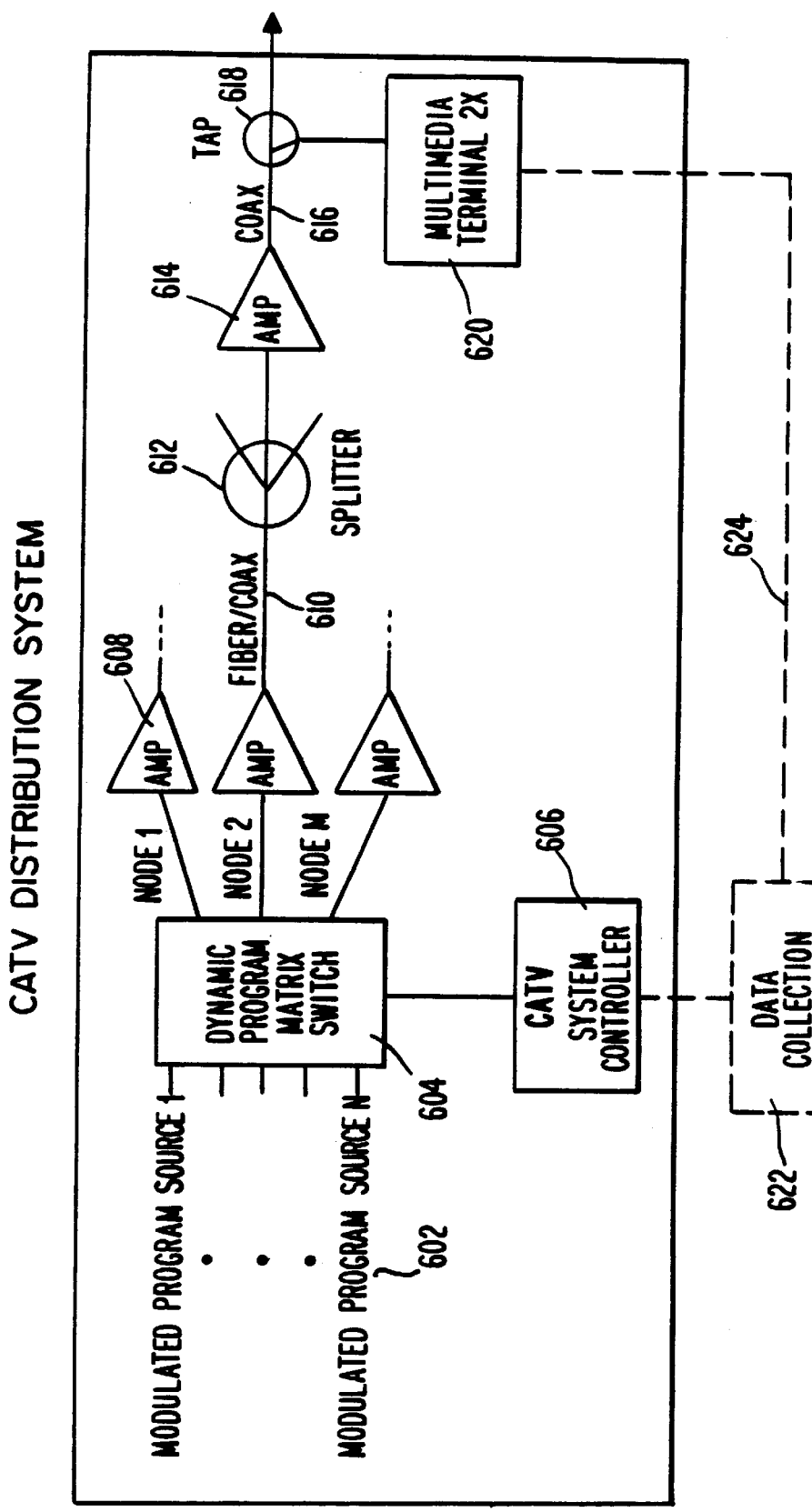
FIG. 6 is a block diagram of a cable television distribution system, including an optional two-way return path, which has been modified to transmit video programs determined from the fed back customer profile data in accordance with the techniques of the invention.

FIG. 6 illustrates an actual cable television distribution system for a cable television implementation of the present invention. As illustrated, a variety of modulated program sources 602 are provided. The programs are selectively (and dynamically) provided to each node via a dynamic program matrix switch 604 at the cable head end. Also at the head end is a cable television (CATV) system controller 606 which designates which programs are to be delivered to each node. The video signal from the switch 604 is amplified by amplifiers 608 and then transmitted over conventional optical fiber and/or coaxial cables 610 to splitters 612 and repeater amplifiers 614 for provision to the customers' homes via coaxial cables 616 and a tap 618. As described with respect to FIGS. 4 and 5, each home on the network is equipped with a set top multimedia terminal 620 which calculates the agreement matrix and generates virtual channels in accordance with the techniques of the invention. If a two-way implementation is used, a data collection mechanism 622 may also be provided for accepting passive feedback data via path 624 from the set top multimedia terminal 620, as in the embodiment of FIG. 5.

In the embodiments of FIGS. 5 and 6, the return path from each remote customer's multimedia terminal to the data collection mechanism at the CATV head end is preferably provided through the telephone network. Such techniques are currently employed in CATV systems for collection of the Pay-Per-View purchasing information to ascertain billing by customers. As in those systems, a telephone interface (FIG. 10) is provided at each customer location, which is, in turn, connected to the multimedia terminal's microprocessor to facilitate information transfer between the multimedia terminal's memory and the CATV head end. As will be described below with respect to FIG. 10, the memory of the multimedia terminal includes relevant profile information and/or specific viewing/purchasing detail records for any and all customer(s) at that remote customer location.

The data collection system (508, 622) can either operate on a real-time or a non-real-time basis, depending upon the desired/required refresh rate for the data collection. In addition, for telephone implementations, any system constraints imposed by the telephone system itself may effect the data collection periodicity and whether it is in real-time or not. Such constraints may be necessary to prevent telephone system overload, which is more likely to occur if data from all the remote terminals were collected at once.

At the CATV head end, the data collection hardware (508, 622) includes a telephone interface, a memory, and a processor which allows for "polling" of the remote terminals in conjunction with the CATV system controller (506, 606). Upon command from the CATV system controller (506, 606), each remote terminal is instructed to "send back" to the head end relevant data for central collection and processing. The data is received through a network interface, and in the case of the telephone network, through the afore-mentioned telephone interface.

The data is then stored in memory of data collection hardware (508, 622) at the CATV head end for processing using the techniques of the invention. In particular, the CATV system controller (506, 606) processes the data collected to maximize the desirability of the programming available on the network. This can be accomplished through clustering the collected data or through other appropriate means. Once the "optimum" desirable programming is determined, the CATV system controller (506, 606) selects, then "routes," the appropriate source programs through the Dynamic Program Matrix Switch 604 to the CATV network as illustrated in FIG. 6. As the name "dynamic" implies, the content and mix of the source programs placed on the network at any given time can change as a result of the changing composite of customer profiles on the network at any given time. In addition, each node of the network can be supplied with its own unique set of independent dynamic source programs from the Dynamic Program Matrix Switch 604.

Since the data passing from the set top multimedia terminal to the head end contains data which the customers may consider to be confidential, the two-way transmission system may be modified to encrypt the transmissions from the set top multimedia terminals to the head end. Similarly, as in the case of Pay-Per-View programming, it is often desirable to encrypt the transmissions from the head end to the set top multimedia terminals. Unfortunately, the bandwidth demands of transmitting digital video and encrypting it in real-time necessitate that any data stream encryption and decryption be of relatively low computational complexity. Additionally, the system should be safe from unauthorized interception and decryption. This may be accomplished by using a one-time session key.

One-time session keys (Vernam Systems) are proven as unbreakable and are of trivial complexity to implement, once the keys are available. A one-time session key involves generating a cipher key which is the same length as the message. The encryption occurs by applying the appropriate ith entry of the key, $K_i$, to the ith symbol in the plain text, $P_i$. For example, the cipher text equivalent, $C_i$, for $P_i$ is $K_i+P_i$. Since $K_i$ is an element of a uniformly distributed random sequence, it is impossible to solve for $P_i$ without knowing $K_i$. Since $K_i$ is an element of a uniformly distributed random sequence of the same length as the message, it removes any possible statistical or structural information that might be exploited in breaking the code. Encryption and decryption are of moderate complexity since they involve decrypting $C_i$ by $P_i=C_i-K_i$. In Vernam systems, rather than using the addition operator, the bit-wise exclusive-OR (EOR) operator is used since it forms the identity operator for even numbers of application (i.e., $EOR(K_i,EOR(K_i,P_i))=P_i$.

The main problem with such methods is in the key distribution, that is, in sharing the one-time session key between the originator and the recipient. In the case of head end to set top multimedia terminal communications, the following simple solution is proposed. Instead of a one-time session key, a seeded pseudo-random number generator is used to generate a sequence of random numbers. The seed for the generator determines the infinite sequence of random numbers, which, in turn, forms the one-time session key. For a given initial seed, the entire pseudo-random sequence may be regenerated. For example, two pseudo-random number generators (e.g., the Linear Congruential Algorithm) using the same seed will generate the same pseudo-random sequence. The seed is encrypted using a high level of encryption such as the RSA public key algorithm with long bit length public and private keys. If the seed is unknown to third parties, and the random number generator is sufficiently unbiased and noninvertible, then it will be impossible for an unauthorized third party to determine the sequence of numbers forming the one-time session key. If both the sender and receiver are synchronized and utilize the same initial seed, they will have the same one-time session key, and thus will be able to consistently encrypt and decrypt the messages. Thus, instead of sending the long key, a single encrypted initializer is sent. The system is unbreakable to the extent that the public key system (RSA) is unbreakable, but the computational simplicity of the one-time session key allows it to be implementable in hardware for very fast encryption and decryption at the head end and at the set top multimedia terminal.

Figure 7:
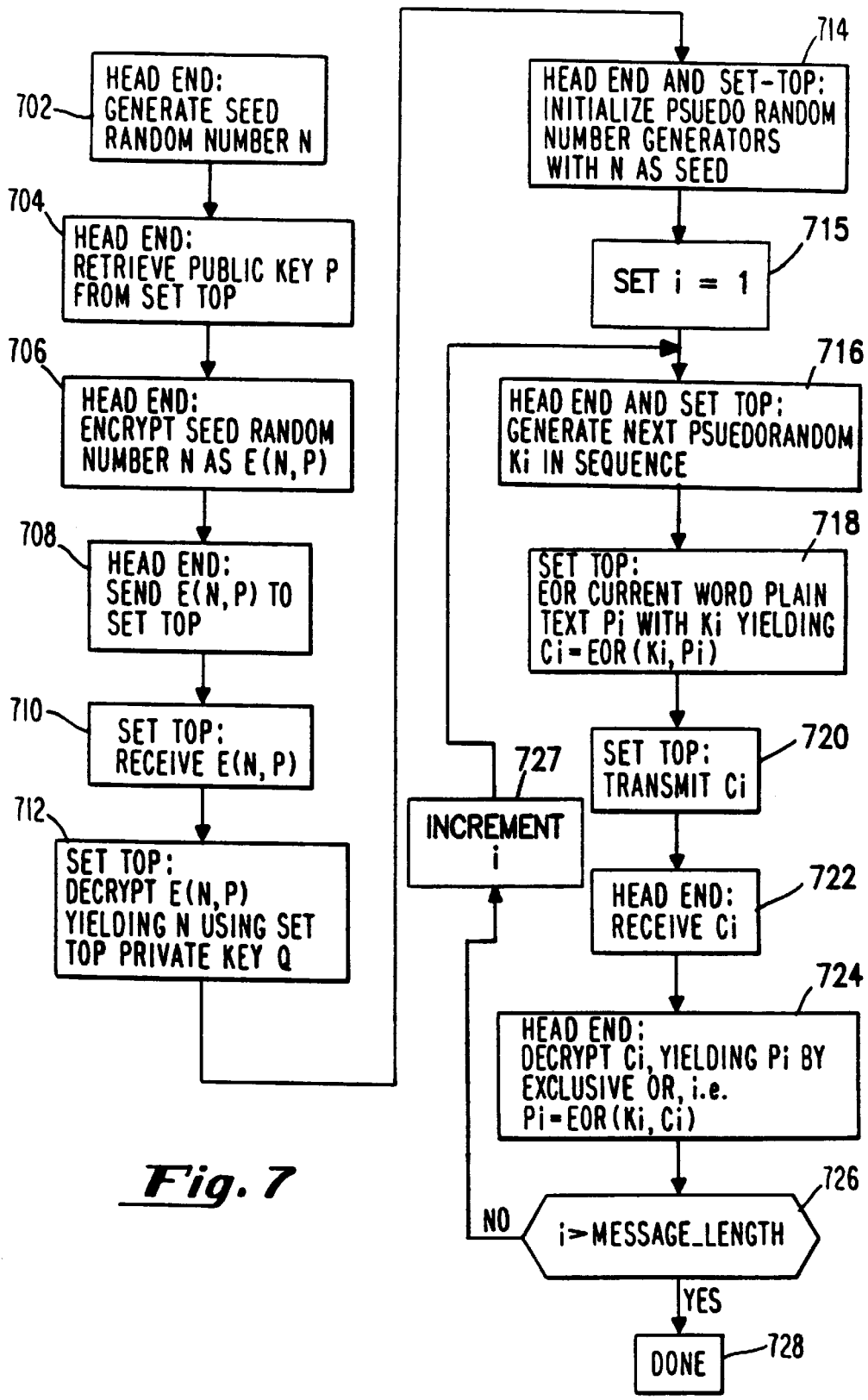
FIG. 7 is a flow diagram of an upstream encryption technique for encrypting data sent from the set top multimedia terminal to the head end in accordance with the techniques of the invention.

Thus, as shown in FIG. 7, upstream encryption for a secure transmission path for transmitting preference data, profile data and the like from the set top multimedia terminal to the head end is performed as follows:

(1) At the head end, generate a seed random number N to be used for the random number generator (step 702).

(2) Retrieve the public key P from the set top multimedia terminal (step 704) and encrypt the seed random number N as E(N,P) at the head end using a public key algorithm such as RSA which is known to be difficult to break (step 706).

(3) Send the encrypted seed N (E(N,P)) to the set top multimedia terminal (step 708) where E(N,P) is received (step 710) and decrypted to yield N using the set top multimedia terminal's private key Q (step 712).

(4) The head end and set top multimedia terminals then initialize their respective pseudo-random number generators with N as a seed (step 714) and initialize i (set i=1) (step 715).

(5) Begin the encryption at the set top multimedia terminal by having the encryptor generate the next number in the sequence $K_i$ (step 716) and logically exclusive-ORing it with the first data word in the stream $P_i$, thereby forming $C_i$ (i.e., $C_i=EOR(K_i,P_i)$) (step 718).

(6) Send the result $C_i$ from the encryptor at the set top multimedia terminal to the head end (step 720), where it is received by the head end (step 722).

(7) Form $K_i$ at the synchronized random number generator of the head end, which has also been initialized with N, by decrypting the received $C_i$ to yield $P_i$. This is done by exclusive-ORing $K_i$ with $C_i$ to yield $P_i$ (i.e., $P_i=EOR(K_i,C_i)$) (step 724), determining whether all words i in the sequence have been decrypted (step 726), incrementing i (step 727), and repeating steps 716–726 until all words in the digital video stream have been decrypted. Normal processing of the digital video stream continues from that point (step 728).

Figure 8:
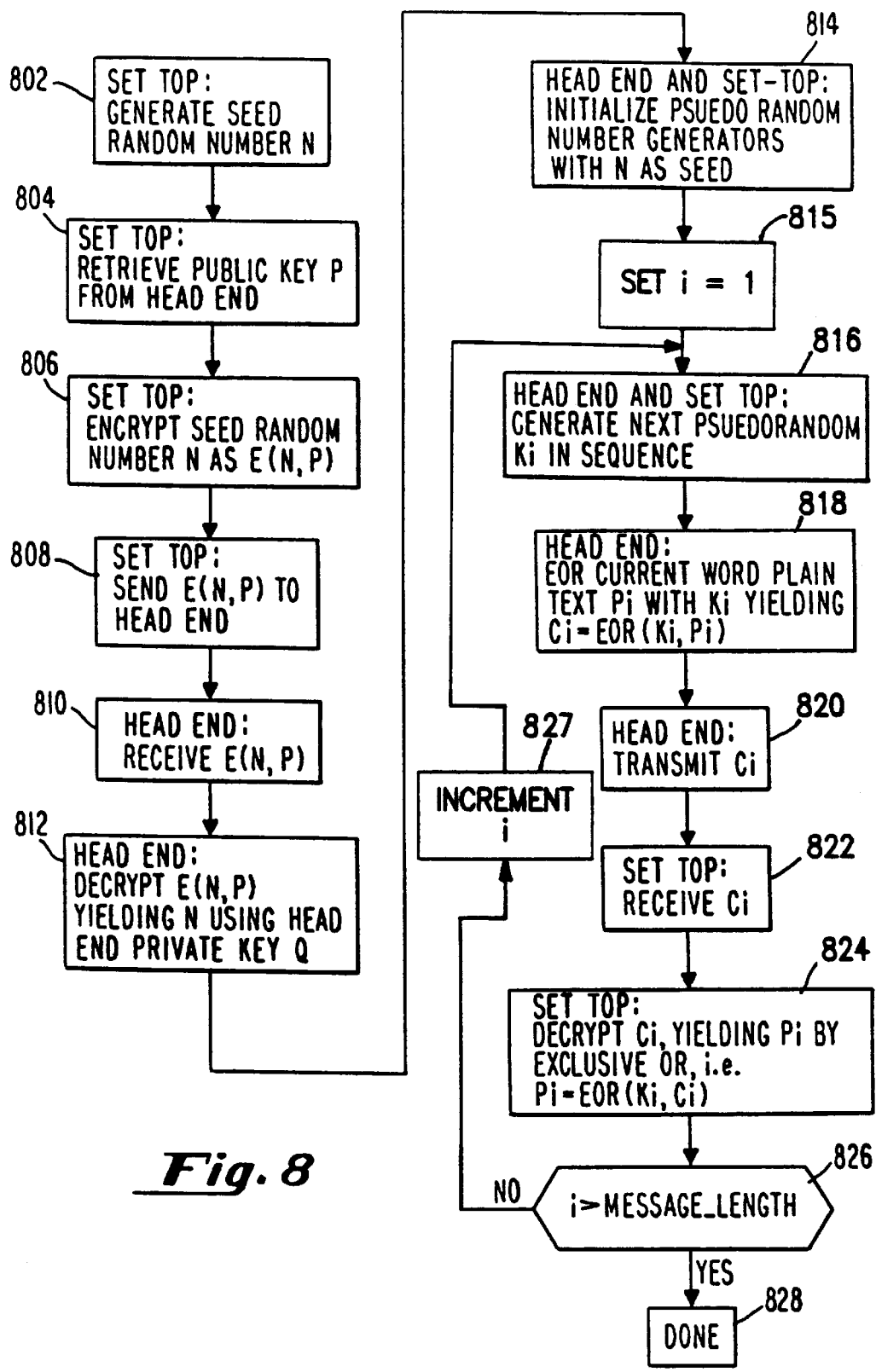
FIG. 8 is a flow diagram of a downstream encryption technique for encrypting data sent from the head end to the set top multimedia terminal in accordance with the techniques of the invention.

As illustrated in FIG. 8, for encryption of the video programming data transmitted from the head end to the set top multimedia terminals, the procedure is identical to steps (1)–(7) above illustrated in FIG. 7, except that the roles of the head end and set top multimedia terminal are reversed.

Advantages of such an encryption/decryption technique include the fact that the operations for encryption and decryption include only an exclusive-OR, which is a one gate delay logical operation. Also, many random number algorithms may be implemented which execute rapidly in hardware shift/divide/accumulate registers. Accordingly, it is desirable to use such an encryption/decryption technique to maintain the security of the two-way data transmission system described in this section.

C. Set Top Multimedia Terminal Embodiments

Figure 9:
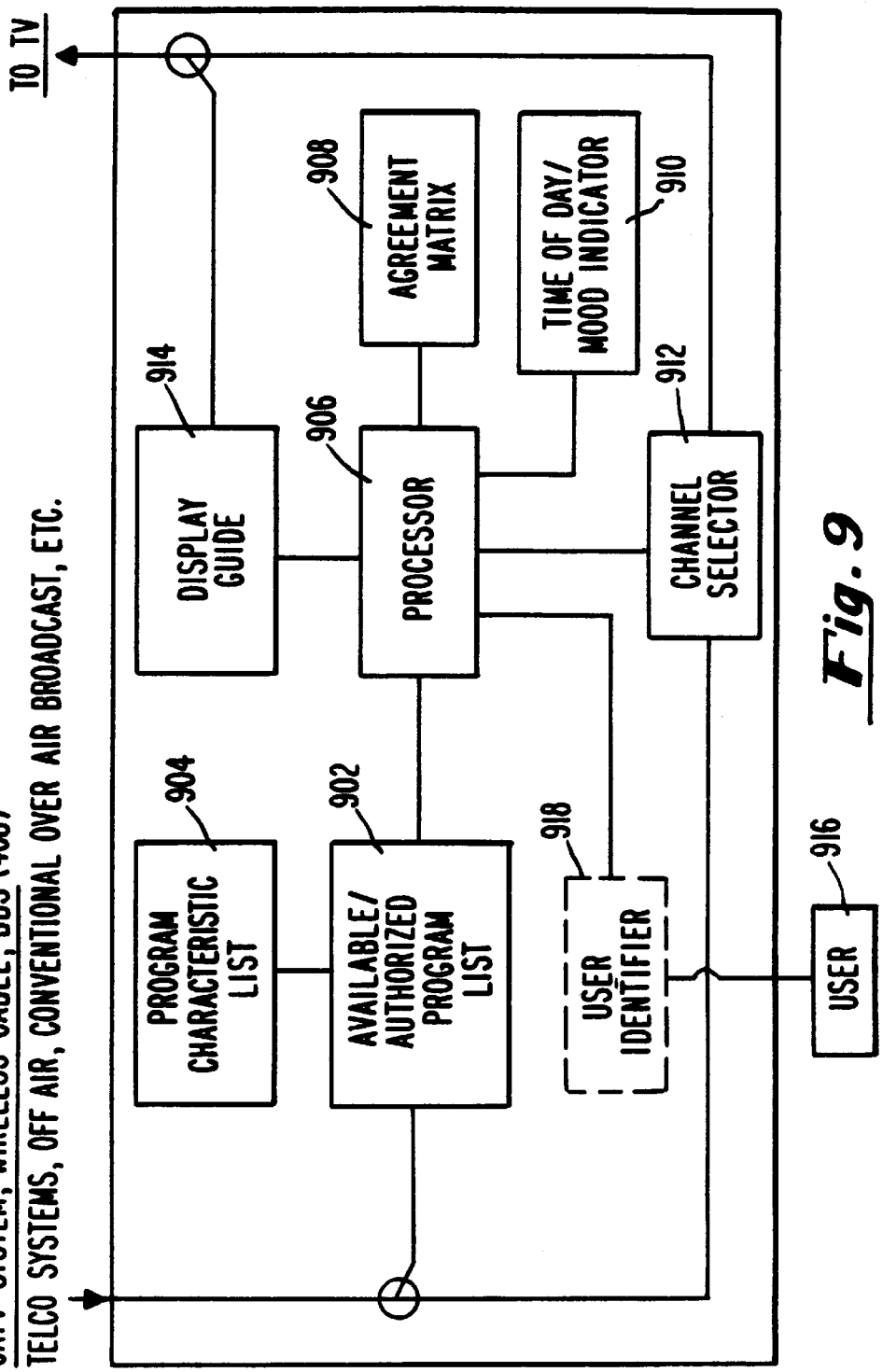
FIG. 9 is a block diagram of the software used in the set top multimedia terminals in a preferred embodiment of the invention.

FIG. 9 illustrates a software block diagram of an embodiment of a multimedia terminal 620 for use in the one-way and two-way system embodiments described above. As illustrated, the video program material and the associated content profiles are received at the set top multimedia terminal 620 from the head end 408. A program list indicating those video programs which the user of that set top multimedia terminal 412 has available and is authorized to receive is stored in memory 902. The associated content profiles (program characteristic lists) is preferably received with the electronic program guide data and stored in memory 904. From the content profiles stored in memory 904, processor 906 calculates and updates the agreement matrix using the techniques described in detail above and stores the resulting agreement matrix in memory 908. As noted above, the customer profiles used in calculating the agreement matrix preferably differ in accordance with the time of the day and of the week and/or the expected mood of the customer. Accordingly, a record of the time of day is stored in memory 910 as received separately from the CATV head end or as input by the customer and maintained locally at the set top multimedia terminal 620. Similarly, the expected mood of the customer is stored in memory 910. As desired, the expected mood may be accessed and modified by the customer.

From the agreement matrix determined by processor 906 and stored in memory 908, a list of "preferred channel selections" or "virtual channels" is determined. An electronic program or display guide 914 listing the available selections is provided. In accordance with the invention, the display guide 914 is either modified to include fields for the "virtual" channels, or else the recommended programming is highlighted in an obvious manner or reordered for the customer's perusal and selection of the desired programming. Once the customer has selected the desired virtual channel from a highlighted program guide or a listing of the programs available on the virtual channels using the customer's remote control unit, processor 906 then accordingly instructs channel selector 912 to tune the channels for the programming determined in accordance with the techniques of the invention to be most desirable to that customer. Display guide 914 also permits the customer to view his or her stored customer profiles including the characteristics and the associated weighted values. This allows the customer to manually modify his or her customer profiles while they are displayed on the screen and/or to select one or more categories to which a selected profile is relevant.

As noted above, numerous customer profiles may be stored at each set top multimedia terminal, each corresponding to a different customer and/or mood of the customer or customers. It is thus desirable that the customer 916 be provided with a customer identifier interface 918, such as a remote control or keypad unit, through which the customer can specify which customer profile to use at a given time and hence which agreement matrix is relevant. In other words, the customer identifier functional block 918 may be used to differentiate multiple customers or to override the mood indicator 910 to allow the customer to select a different profile than that which would otherwise be recommended in accordance with the time of day or expected mood of the customer. The customer identifier functional block 918 may also allow a customer to lock out others from using a particular profile for a particular virtual channel, such as an "adult" channel which the customer would not like his or her children to view. The customer identifier functional block 918 may further allow the customer to manually change and/or modify his or her customer profiles by adjusting the weights or values of certain characteristics. Also, manual adjustment may be used to allow parents to set profiles for their children and/or to limit the children's access to the parents' profiles. In this manner, parents will be given more control to limit what their children watch to educational or other suitable programming, even when the parents are not present to supervise the children's viewing habits. For this purpose, it is desirable that display guide 914 be permitted to display the customer profiles and weightings from agreement matrix 908 and the program list from memory 904.

The software illustrated in FIG. 9 is stored in the set top multimedia terminal 620 connected to each customer's television. A currently preferred hardware embodiment of the set top multimedia terminal will now be described with respect to FIG. 10.

Figure 10:
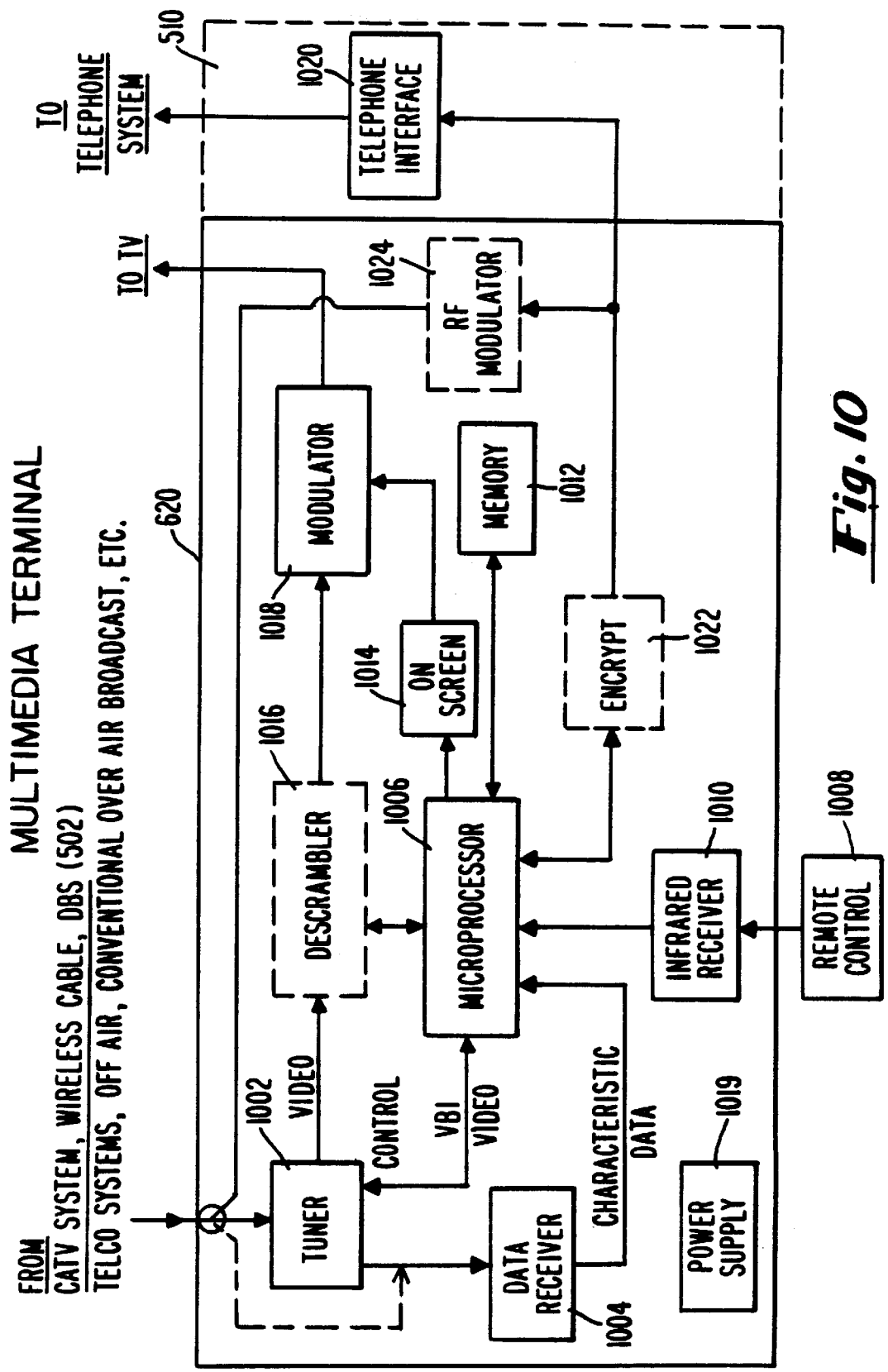
FIG. 10 is a block diagram of a preferred hardware implementation of a set top multimedia terminal in accordance with the invention.

FIG. 10 illustrates a hardware embodiment of set top multimedia terminal 620. As shown, the video program material and corresponding content profiles are received from the head end 502 by tuner 1002, or the content profiles are separately received at data receiver 1004 along with the electronic program guide information via the dotted line path. If scrambling is employed, as in the transmission of Pay-Per-View video programming, the scrambled video signals are supplied from tuner 1002 to descrambler 1016 before being further processed by microprocessor 1006 and/or modulated by modulator 1018 for display in accordance with the invention. If tuner 1002 selects a channel containing video program data in its vertical blanking interval ("VBI data") received from head end 502, the VBI data is supplied directly to microprocessor 1006 and/or the content profile data is supplied to microprocessor 1006 via data receiver 1004. The video data is supplied directly to the descrambler, as necessary, and then to the modulator 1018 for display in a conventional manner.

Microprocessor 1006 generates the agreement matrix as described in detail above. Input from the customer is provided to microprocessor 1006 via remote control device 1008 and infrared receiver 1010 associated with the set top multimedia terminal 620. The customer profile data and/or records of the viewing habits of the customer are stored in memory 1012 and used in the calculation of the agreement matrix by microprocessor 1006. From the agreement matrix, microprocessor 1006 satisfies the customer's "appetite" for video programming by creating a designated number of "virtual" channels for the customer's consideration at any given time. The "virtual" channels determined by microprocessor 1006 are then presented to the customer's television via screen generating circuit 1014 and a modulator 1018 in accordance with known techniques. The customer then tunes to the desired channel or "virtual" channel to receive the program selected to match that customer's interests. Power for the illustrated circuitry is provided by power supply 1019.

For use in the two-way system described above with respect to FIG. 5, the set top multimedia terminal 620 of FIG. 10 is modified to include the features indicated in phantom. In particular, telephone interface 1020 provides a reverse path for collecting the customer profile and viewing habit data from memory 1012 in a database at the head end 502 on a periodic basis. As noted above, this information is preferably encrypted by encryptor 1022 before transmission to the head end 502 for appropriately updating the customer profiles and the content profiles and modifying the scheduling of video programming to all of the customers serviced by that head end 502. Alternatively, an RF modulator 1024 may be provided for providing real-time communication directly between the set top multimedia terminal 512 and the head end 502 via the CATV or over air transmission system.

Of course, other set top multimedia terminal designs are possible in accordance with the invention. For example, if the agreement matrix for each customer is calculated at the video head end, the electronics of the set top multimedia terminal 620 are greatly simplified. In addition, appropriate modifications can be made to the circuitry for use in the video head end. Such modifications are believed to be readily apparent to those skilled in the art.

VII. Alternative Embodiments of Systems Which Use Agreement Matrix

While a preferred embodiment of the invention has been described with respect to a video distribution system, the present invention may be used to selectively provide other materials such as news, video games, software, music, books and the like to customers based upon the profiles of those customers. The present invention also may be modified for use in an interactive system to anticipate what customers are likely to request so that the information may be downloaded in advance using, for example, a simple Markov model and/or probability transition matrices in an event graph. The present inventors contemplate many such embodiments within the scope of the claims and will highlight a few such embodiments below. Of course, many other embodiments within the scope of the claims will become apparent to those skilled in the art.

A. Video Distribution Systems

As described in detail above, a preferred embodiment of the invention determines an agreement matrix for matching customer preferences to available video programming and presenting the most desirable video programs on one or more "virtual channels" customized for the customer, thereby minimizing "channel surfing". This is accomplished by calculating an agreement matrix which matches the characteristics desired by customers with corresponding characteristics of the video programs. In one alternate embodiment of the invention described above, video programs that tend to be liked by the same people are clustered together or, on the other hand, customers with similar interests are clustered together using the agreement matrix. In this manner, the system of the invention is used to determine which video programming best meets the needs of a designated viewership.

It has also been suggested above that clustering techniques may be used to provide a relatively homogeneous population with targeted advertising. What is significant about the invention in this context is that the agreement matrix may be updated based on feedback including actual purchases made by the customer in response to such targeted advertising. For example, when shopping at home using infomercials, as when watching a movie, the products available for purchase can be characterized using different attributes and an agreement matrix formed between customer profiles and product profiles. The agreement matrix can also be used to select infomercials or other advertisements that the customer is most likely to watch and to respond to by making purchases. If purchase information is available, the customer profiles can be updated using the same algorithm described above with respect to video programs, but now the updating is based on what the customer actually purchased as well as what infomercials he or she watched.

The clustering method of the invention may also be modified to include sociodemographic profiles of customers. Such information may include ages, gender, and race, as well as other information provided by the customers themselves. On the other hand, the clustering data may include census data such as zip code data. For example, as noted above, a zip code may be used as one way to categorize the customer profiles of the customers whereby a new customer to a system would get one or more of a number of generic customer profiles for a particular zip code as his or her initial customer profile. The initial customer profile would then be modified as that customer's viewing habits are established. As noted above, such modifications may be accomplished using psychographic data, customer preference profiles input directly by the customer, past movie selections, rave reviews, passive feedback based on actual television viewing by that customer, records of customer purchases, and the like.

It will also be appreciated that the one-way and two-way systems may coexist in a hybrid system. In such a hybrid system, the feedback paths from the two-way set top multimedia terminals could be used by test audiences to provide initial content profiles for new movies before the movies are made available to all. Similarly, the feedback paths from the two-way set top multimedia terminals may be used to provide initial content profiles for subsequent episodes of television series. By using this approach, no experts or studio test groups would be needed to establish the initial content profiles for new video programming. Also, content profiles would be available for all video programming other than that provided solely to the test audiences.

Generally, the two-way set top multimedia terminals would belong to customers connected to the same nodes as other customers having one-way set top multimedia terminals. As a result, the content profiles determined from the test programming and the like may also be used to provide initial customer profiles specific to a new customer to that node. Such a technique may also be used to monitor changing preferences and even changes in demographics for the customers connected to each node by periodically updating the clustered customer profiles for that node to reflect the changes in the customer profiles of those customers connected to a particular node.

Those skilled in the art will also appreciate that the invention may be used in the context of a "Home Video Club" of the type described by Herz et al. in U.S. Pat. No. 5,351,075 to schedule desired programming. In addition, the invention may be used as a navigational aid to help customers determine what they want to watch as well as to target a set of movie previews for particular customers to examine.

Those skilled in the art will also appreciate that the basic agreement matrix described above can be generalized to include various weightings such as national popularity, customer requests for movies, customer requests for times, data on viewership by category and time, and the like. The present invention is also flexible enough to allow the scheduler to keep regular shows at regular times to draw customers while giving the customers the options to select the "best" of what is available on the other channels. In such a scenario, one could mix network television with special cable programming as well as video on demand. Of course, each customer could also have one or more of his/her own "customized" virtual channels showing his or her own requests. Similarly, each customer could adopt the customer profiles of other individuals or programs such as "celebrity" profiles including the viewing preferences of different celebrities. However, such "celebrity" profiles must not be updated through passive feedback as described herein and should remain unchanged.

Also, since there is usually more than one television viewer in a household, it may be desirable to keep multiple clusters of preferences for one television. Those skilled in the art will appreciate that this may be handled in a manner similar to the different moods described above. For example, the customer profiles of two or more customers may be combined, with equal or unequal weightings, so that the video programming with content profiles strictly within the overlap area of the combined customer profiles will be preferred. In this manner, customers such as a husband and wife with very different preferences may be presented video programming options which are mutually agreeable.

Also, the techniques described above may be used to create a virtual channel for video previews whereby previews of movies and the like available in an on-demand system, for example, may be presented to customers in a personalized manner. This may be accomplished even in hotels and the like by providing individuals with personalized ID cards which store their profiles and card readers at the set top multimedia terminals which read in the customer's profiles from the ID cards for local recreation of the customer's agreement matrix. If desired, the updated customer profiles may be stored back to the ID card at the end of the customer's Television viewing.

B. Video, Music and Bookstore Kiosks

Figure 11:
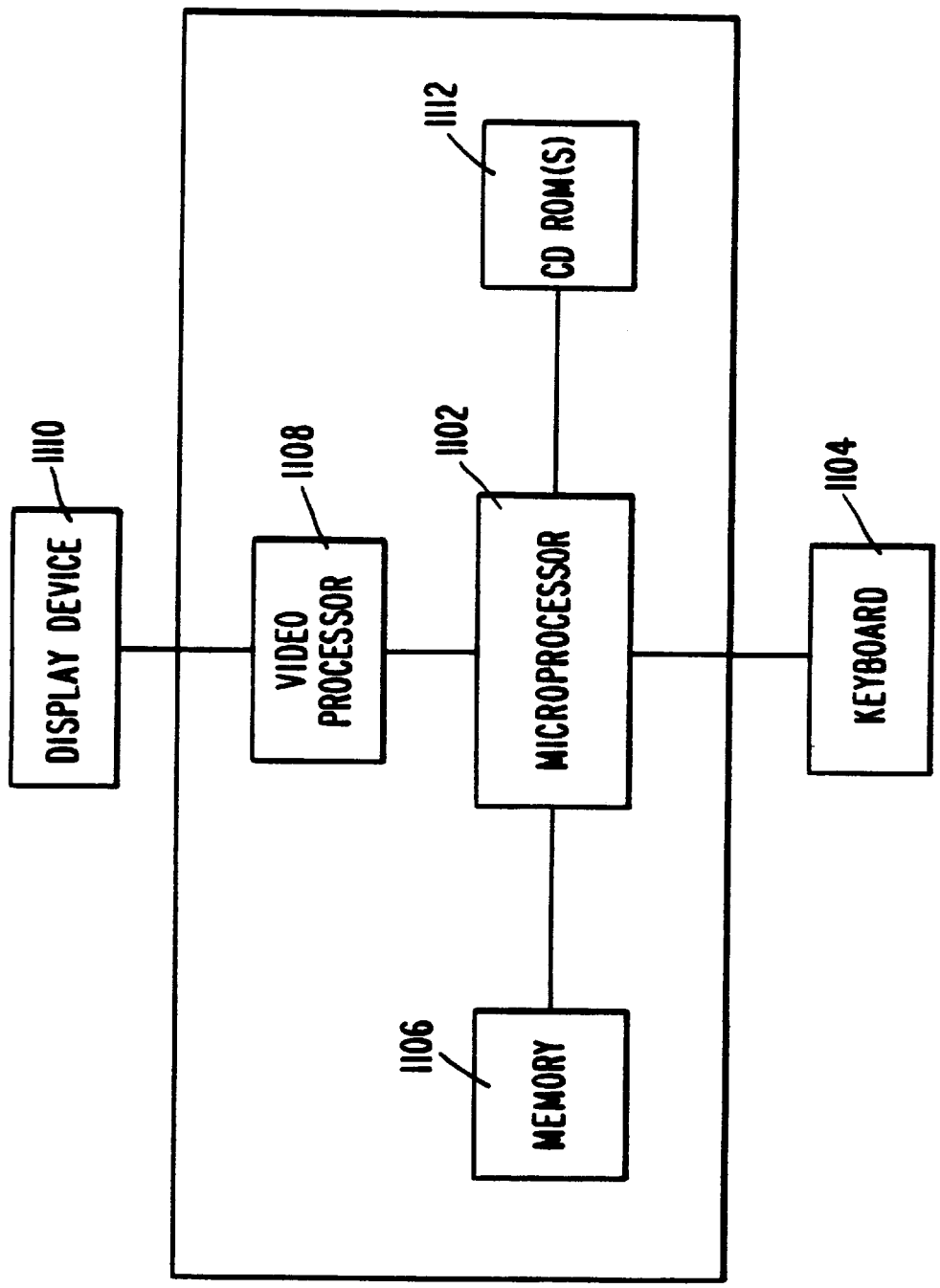

The methods of the invention also may be implemented in a kiosk or personal computer as illustrated in FIG. 11 for use in a video, music and/or book store to help customers decide which videos to rent or music and books to buy. The kiosk or personal computer would be similar in structure to the kiosk disclosed in U.S. Pat. No. 5,237,157 to Kaplan and would include a microprocessor 1102. However, a kiosk or personal computer implemented in accordance with the invention also accepts identity information from the customers either via keyboard 1104 or by electronic reading of a membership card by an electronic card reader (not shown) and retrieves customer profiles for that customer from memory 1106 for use in forming an agreement matrix as described above. Those skilled in the art will appreciate that, unlike the broadcast embodiment above, it is necessary in the kiosk embodiment to match the customer profiles to individuals by name or user ID rather than time slot. Such values are provided via keyboard 1104 or an electronic card reader so that the customer profiles for that customer may be retrieved.

Recommendations are then selected by microprocessor 1102 using the same algorithm described above for the selection of "virtual" channels. Movies which were recently rented by the customer could be determined by checking that customer's rental records and optionally be removed from the list presented to the customer. Customer profiles also would be updated based on the movies selected using the algorithm and optionally could be altered to include a rating of the movie provided by the customer when he or she returns the video.

The profiling technique of the invention also forms the basis for a customer to select a movie by example, as in a "rave review" described above. As described in Section V.B. above, since customers often do not have existing profiles, new customers may create an initial customer profile by selecting one or movies which are similar to what he or she is looking for so that the profiles of these sample movies may be looked up and averaged to provide a customer profile. This customer profile is used in combination with a standard set of weights to establish the importance of the characteristics to generate an agreement matrix indicating how much the customer should like each movie which is now available. The 3 to 5 movies (or 10 movies) with the highest agreement (maximum value for ac) are then presented to the customer via video processor 1108 for display on display device 1110 along with brief descriptions. As above, movies can be excluded which the customer has recently rented. As shown in FIG. 11, a CD ROM player 1112 may also be provided at the kiosk to facilitate the playing of short "clips" of the movies with the highest agreement to further assist the customer in his or her final selection.

Another interesting aspect of kiosk embodiments in which user IDs are used to select the customer profiles is that the system may be used to facilitate the selection of videos which will appeal to several people. For example, the customer may enter the user IDs for those individuals expected to watch a particular movie rental. The customer profiles for each person are retrieved and compared to the customer profiles of the others entered by the customer. The intersection or averaging of the customer profiles may then be used in determining the agreement matrix so that the system will select those videos with the most appeal to all persons specified by the customer.

Alternatively, when an agreement matrix is implemented in a music or book kiosk to aid in the selection of music or books, the characteristics of movies are replaced by the characteristics of music or books. For music, such characteristics might include standard classifications such as rock, easy listening, classical, country, or other classifications such as performing artists, decade or century the music was written, approximate year of release, popularity on "the charts", length and the like, while for books, such characteristics might include author, standard classifications such as mystery, fiction, non-fiction, as well as length, date of first publication, and the like. Characteristics of the music or books would similarly be matched against those desired by customers to create an agreement matrix which would direct the customer to those selections most likely to be found desirable.

Music kiosks and book kiosks could also be used in music and/or book stores to aid in the selection of music or books for purchase. Unlike the kiosks described in the Kaplan '157 patent, however, the kiosks would allow potential purchasers to look up music or book selections by example and would match the customer's preferences to the characteristics of the available inventory. The potential buyer could listen to segments of those music selections or review the summaries and reviews of those books with the highest agreement to the customer profile created from the sample music or book selections.

Also, as in the video embodiment described above, the content profiles of certain radio stations may be used to assist the customer in selecting a radio station from those available, or alternatively, a "virtual" radio channel may be created for over air or cable transmission. Of course, the concepts herein described may be used to schedule music videos and to schedule the transmission of music over air or cable transmission systems. Feedback could also be used to improve the content and customer profiles as described above with respect to video program selection.

C. Data Retrieval Systems

Those skilled in the art will appreciate that the method of generating agreement matrices for selecting preferred video programming as described herein may be generalized for use in other types of data retrieval systems besides video and music. For example, the techniques of the invention may be used for the optimum selection of any chunks of information such as stock market data, print information (e.g., for personalized newspapers), or multimedia information which can be downloaded over networks such as the Internet.

In the case of retrieving stock market data from a computer network, response times for retrieving certain stock market data can be shortened by anticipating which menu selections the customer is likely to use and downloading that information in anticipation of its likely use. One particularly useful example of this would be the retrieval of information about stocks such as recent trade prices and volumes. Since stocks, like movies, can be characterized in multiple ways, such as by industry, dividend size, risk, cost, where traded, and the like, profiles of stock may be developed in a similar manner to that described above. The stocks also can be characterized by whether they are owned by the customer and by whether they have exhibited unusual recent activity. These characteristics can be used to create profiles and agreement matrices using the identical techniques described above. In addition, if a customer exhibits a pattern in their request for information about stocks, their requests can be anticipated and menus assembled to ease selection of the stocks so as to avoid potentially long searches through multiple windows, or the information can be downloaded in advance of the customer's request to reduce waiting time. Such anticipation of customer requests for information is particularly useful when the waiting time may be significant, as for multimedia information incorporating graphical or auditory information. It is also valuable when large amounts of information can be transferred at lower cost, for example, using lower cost transmissions at night in anticipation of requests for information the following day.

Similarly, in the case of retrieving text or other print information, a customer may be aided in his or her navigation through a tree of possible menu items by having the system anticipate which branches are most likely to be followed and downloading information in advance of the information being requested, thereby significantly speeding up the system response. Old information which is unlikely to be used can be flushed from memory. This allows information to be ready at the local machine when it is needed.

Also, media cross-correlation is also possible using the techniques of the invention by using the profile from one media to estimate the customer preference for another media. Such an approach might be useful, for example, to predict that an avid customer of sports programs could also be very interested in obtaining sports or news information or information regarding the purchase of sports memorabilia based on his or her viewing preferences. Likewise, listeners of a particular type of music may also be interested in purchasing concert tickets for the same or similar types of music.

Finally, the techniques of the invention may be used to match a potential purchaser to real estate on the market by creating profiles of the characteristic features of a house such as size, location, costs, number of bedrooms, style, and the like. The potential purchaser can request his or her "dream home" by giving example houses, by specifying desired characteristics such as range of prices, or by a combination of the two. The agreement matrix would match the customer's profiles to the profiles of the available homes and create an agreement matrix. The system could also verify that the profiles initially entered by the potential purchasers are accurate by suggesting houses of a somewhat different type than those the customer has requested. A house retrieval system which is customer controlled could also be developed using the techniques of the invention. In this example, the data source would be the standardized real estate listings.

Although numerous embodiments of the invention and numerous extensions of the inventive concept have been described above, those skilled in the art will readily appreciate the many additional modifications are possible in the exemplary embodiments without materially departing from the novel teachings and advantages of the invention. Accordingly, all such modifications are intended to be included within the scope of this invention as defined in the following claims.

We claim:

1. A method of scheduling customer access to data of a plurality of data objects, comprising the steps of:

creating at least one customer profile for a customer of said data, said customer profile indicating the customer's preferences for data having predetermined characteristics;

creating content profiles for each of said data objects, said content profiles indicating at least one of the presence and the degree of content of said predetermined characteristics in data of each of said data objects;

relating said at least one customer profile with the content profiles for the data available from each data object to the customer at a particular time;

determining a subset of data having content profiles which are determined in said relating step to most closely match said at least one customer profile; and presenting said subset of data to said customer for selection.

2. A method as in claim 1, wherein said relating step comprises the step of determining a distance between a customer profile and a content profile in a characteristic space by calculating an agreement scalar for common characteristics, ac, between said at least one customer profile, cv, and said content profiles, cp, in accordance with the relationship:

$$ac_{ij} = 1/[1+\Sigma_k w_{ik}|cv_{ik} - cp_{jk}|],$$

for i=a particular customer of a number of customers I, j=a particular data object of a number of data objects J, and k=a particular characteristic of a data object of a number of data object characteristics K, where $cv_{ik}$ is greater than or equal to 0 and $w_{ik}$ is customer i's normalized weight of characteristic k.

3. A method as in claim 1, comprising the further steps of:

monitoring which data objects are actually accessed by said customer; and updating each customer profile in accordance with the content profiles of the data objects actually accessed by that customer to update that customer's actual preferences for said predetermined characteristics.

4. A method as in claim 1, comprising the further steps of:

monitoring which data objects are actually accessed by said customer; and updating said customer profile to reflect the frequency of selection of the data objects by customers with customer profiles substantially similar to said customer profile.

5. A method as in claim 4, wherein said customer profile creating step comprises the steps of:

selecting a number of desired groups K into which said customers are divided whereby each customer in a group has a customer profile substantially similar to a customer profile of each other customer in said group;

grouping said customers into K groups so as to minimize:

$$\sum_{\substack{\text{clusters} \\ k=1 \text{ to } K}} \sum_{\substack{\text{customers} \\ i \text{ in } K}} |v_i - v_k|$$

where $|v_i - v_k|$ is a distance between the vector of characteristics of the data objects accessed by customer i and the centroid of group k; and determining an agreement matrix $ac_{ij}$, where for each customer i, a jth row of the agreement matrix is a vector $v_k$ for a group k in which customer i belongs.

6. A method as in claim 1, wherein said step of creating at least one customer profile comprises the step of including in said at least one customer profile a profile of data previously accessed by said customer.

7. A method as in claim 1, wherein said step of creating content profiles comprises the step of including in said content profiles data reflecting the customer profiles of those customers who have previously accessed said data from each data object.

8. A method as in claim 1, wherein said data includes electronic program guide data, and said presenting step comprises the step of downloading, in a memory of a customer's electronic program guide receiving device, program descriptions in said electronic program guide only for those entries in said electronic program guide which have content profiles which are determined in said relating step to most closely match said at least one customer profile.

9. A method as in claim 1, wherein said customer is connected to a plurality of data sources over a data network, and wherein said presenting step comprises the step of downloading said subset of data to said customer from said data source prior to selection by said customer of a menu item identifying said subset of data.

10. A method as in claim 9, comprising the further steps of:
monitoring a customer's pattern in navigating through said data sources to access data having characteristics desirable to said customer; and
creating at least one customer profile for said customer indicating the customer's pattern in navigating through said data sources to access said data having characteristics desirable to said customer,
wherein said downloading step further comprises the step of downloading said data having characteristics desirable to said customer from said data sources prior to selection by said customer of menu items used on said data network for navigating to said data.

11. A data transmission system which schedules customer access to data of a plurality of data objects, comprising:
means for generating at least one customer profile for a customer of said data, said customer profile indicating the customer's preferences for data having predetermined characteristics;
means for generating content profiles for each data object, said content profiles indicating at least one of the presence and the degree of content of said predetermined characteristics in data of each data object;
means for relating said at least one customer profile with the content profiles for the data available from each data object to the customer at a particular time;
means for determining a subset of data having content profiles which most closely match said at least one customer profile; and
means for presenting said subset of data to said customer for selection.

12. A system as in claim 11, wherein said relating means comprises a processor programmed to determine a distance between a customer profile and a content profile in a characteristic space by calculating an agreement scalar for common characteristics, ac, between said at least one customer profile, cv, and said content profiles, cp, in accordance with the relationship:

$$ac_{ij} = 1/[1 + \Sigma_k w_{ik} | cv_{ik} - cp_{jk} |],$$

for i=a particular customer of a number of customers I, j=a particular data object of a number of data objects J, and k=a particular characteristic of a data object of a number of data object characteristics K, where $cv_{ik}$ is greater than or equal to 0 and $w_{ik}$ is customer i's normalized weight of characteristic k.

13. A system as in claim 11, further comprising:
means for monitoring which data objects are actually accessed by each customer; and
means for updating each customer profile in accordance with the content profiles of the data objects actually accessed by that customer to update each customer's actual preferences for said predetermined characteristics.

14. A system as in claim 11, further comprising:
means for monitoring which data objects are actually accessed by each customer; and
means for updating each customer profile to reflect the frequency of selection of the data objects by customers with customer profiles substantially similar to said each customer profile.

15. A system as in claim 14, wherein said means for generating at least one customer profile comprises processing means which selects a number of desired groups K into which said customers are divided whereby each customer in a group has a customer profile substantially similar to the customer profile of each other customer in said group, groups said customers into K groups so as to minimize:

$$\sum_{\substack{\text{clusters} \\ k=1 \text{ to } K}} \sum_{\substack{\text{customers} \\ i \text{ in } K}} |v_i - v_k|$$

where $|v_i - v_k|$ is a distance between the vector of characteristics of the data objects accessed by customer i and the centroid of group k, and determines an agreement matrix $ac_{ij}$, where for each customer i, a jth row of the agreement matrix is a vector $v_k$ for a group k in which customer i belongs.

16. A system as in claim 11, wherein said means for generating at least one customer profile includes in said at least one customer profile a profile of data previously accessed by said customer.

17. A system as in claim 11, wherein said means for generating content profiles includes in said content profiles data reflecting the customer profiles of those customers who have previously accessed said data from each data object.

18. A system as in claim 11, wherein said data includes electronic program guide data, and said presenting means comprises means for downloading, in a memory of a customer's electronic program guide receiving device, program descriptions of an electronic program guide in said electronic program guide data only for those entries in said electronic program guide which have content profiles which are determined by said relating means to most closely match said at least one customer profile.

19. A system as in claim 11, wherein said customer is connected to a plurality of data sources over a data network, and wherein said presenting means includes means for downloading said subset of data to said customer prior to selection by said customer of a menu item identifying said subset of data.

20. A system as in claim 19, further comprising:
means for monitoring a customer's pattern in navigating through said data sources to access data having characteristics desirable to said customer; and
means for creating at least one customer profile for said customer indicating the customer's pattern in navigating through said data sources to access said data having characteristics desirable to said customer,
wherein said downloading means downloads said data having characteristics desirable to said customer prior to selection by said customer of menu items used on said data network for navigating to said data.

21. A system as in claim 11, further comprising means for identifying a customer and for providing customer profiles for said customer to said determining means for determining said subset of data for said customer.

22. A system as in claim 11, further comprising means for providing different customer profiles to said determining means in accordance with the time of day and day of the week.

23. A system as in claim 11, wherein said presenting means presents said subset of data to the customer as a virtual data channel.

24. A system as in claim 11, further comprising means for storing an electronic program guide at a customer's set top terminal, wherein said presenting means highlights programs within said electronic program guide which correspond to said subset of data.

25. A system as in claim 24, wherein said electronic program guide storing means stores program descriptions of said electronic program guide only for those entries in said electronic program guide which have content profiles which are determined by said determining means to most closely match said at least one customer profile.

26. A system as in claim 11, further comprising an interface which through which said determining means provides upstream data messages.

27. A system as in claim 26, further comprising encrypting means for encrypting said upstream data messages.

* * * * *

UNITED STATES PATENT AND TRADEMARK OFFICE
CERTIFICATE OF CORRECTION

PATENT NO. : 6,088,722
DATED : 7/11/00
INVENTOR(S) : Herz, et al.

It is certified that error appears in the above-identified patent and that said Letters Patent is hereby corrected as shown below:

Col. 10, line 62,"is" should be -- i's--; (PTO)

Col. 17, line 40, "a" should be --"a"--; (PTO)

Col. 51, line 4, "Television" should be --television--. (PTO)

Signed and Sealed this

Seventeenth Day of April, 2001

Attest:

NICHOLAS P. GODICI

Attesting Officer

Acting Director of the United States Patent and Trademark Office